(12) United States Patent
Masuko

(10) Patent No.: US 10,037,497 B2
(45) Date of Patent: Jul. 31, 2018

(54) INFORMATION PROVISION DEVICE, INFORMATION PROVISION METHOD, AND INFORMATION PROVISION PROGRAM

(71) Applicant: RAKUTEN, INC., Tokyo (JP)

(72) Inventor: Soh Masuko, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 390 days.

(21) Appl. No.: 14/652,693

(22) PCT Filed: Jun. 28, 2013

(86) PCT No.: PCT/JP2013/067869
§ 371 (c)(1),
(2) Date: Jun. 16, 2015

(87) PCT Pub. No.: WO2014/207913
PCT Pub. Date: Dec. 31, 2014

(65) Prior Publication Data
US 2015/0332175 A1   Nov. 19, 2015

(51) Int. Cl.
G06Q 10/00 (2012.01)
G06Q 10/02 (2012.01)
G06F 17/30 (2006.01)

(52) U.S. Cl.
CPC ....... *G06Q 10/02* (2013.01); *G06F 17/30554* (2013.01); *G06F 17/30864* (2013.01); *G06F 17/30876* (2013.01)

(58) Field of Classification Search
CPC .............. G06Q 40/00; G06Q 10/00

(Continued)

(56) References Cited

U.S. PATENT DOCUMENTS

| 5,933,810 A * | 8/1999 | Okawa | G06Q 10/02 705/5 |
| 6,079,863 A * | 6/2000 | Furukawa | G06Q 10/109 235/381 |

(Continued)

FOREIGN PATENT DOCUMENTS

JP    2001-167162 A    6/2001

OTHER PUBLICATIONS

International Preliminary Report on Patentability dated Jan. 7, 2016 from the International Bureau in counterpart International application No. PCT/JP2013/067869.

*Primary Examiner* — Oluseye Iwarere
(74) *Attorney, Agent, or Firm* — Sughrue Mion, PLLC

(57) ABSTRACT

An information provision device according to one embodiment includes a receiving unit, an extraction unit, a setting unit and a presentation unit. The receiving unit receives search criteria. The extraction unit extracts reservation acceptance information of the target facility corresponding to a past determination target period based on the search criteria by referring to a storage unit storing reservation acceptance information of a facility. The setting unit calculates a rate of decrease from an initial number of vacancies in the target facility during the past determination target period based on the extracted reservation acceptance information, and when there is a date of change when the number of vacancies has changed to be less than a specified threshold during the determination target period, sets an estimated date for a reservation request. The presentation unit outputs the value set-as estimate information for reservation request.

10 Claims, 19 Drawing Sheets

(58) Field of Classification Search
USPC .................................................... 705/5, 39
See application file for complete search history.

(56) References Cited

U.S. PATENT DOCUMENTS

| | | | | |
|---|---|---|---|---|
| 8,571,901 | B2* | 10/2013 | Shoen | G06Q 10/02 705/5 |
| 8,972,434 | B2* | 3/2015 | English | G06Q 30/0603 707/706 |
| 2002/0072939 | A1* | 6/2002 | Kawaberi | G06Q 10/02 705/5 |
| 2003/0005055 | A1* | 1/2003 | Ralston | G06F 19/327 709/204 |
| 2004/0260659 | A1* | 12/2004 | Chan | G06Q 10/02 705/400 |
| 2009/0150343 | A1* | 6/2009 | English | G06Q 30/0603 |
| 2009/0164259 | A1* | 6/2009 | Mizrachi | G06Q 10/02 705/5 |
| 2011/0099038 | A1* | 4/2011 | Nishida | G06Q 50/12 705/5 |
| 2013/0226631 | A1* | 8/2013 | Yamada | G06Q 10/02 705/5 |
| 2013/0275165 | A1* | 10/2013 | Udagawa | G06Q 10/02 705/5 |
| 2014/0114847 | A1* | 4/2014 | Watanabe | G06Q 40/00 705/39 |
| 2014/0129264 | A1* | 5/2014 | Katagiri | G06Q 10/02 705/5 |
| 2014/0164030 | A1* | 6/2014 | Katagiri | G06Q 10/10 705/5 |
| 2015/0213377 | A1* | 7/2015 | Ito | G06Q 10/10 705/5 |
| 2015/0332175 | A1* | 11/2015 | Masuko | G06Q 10/02 705/5 |
| 2016/0012354 | A1* | 1/2016 | Koshinuma | G06Q 10/02 705/5 |

* cited by examiner

Fig. 17

PAIR {AREA A, KEYWORD Ka}

| MONTH | 1 | 2 | 3 | 4 | 5 | 6 | 7 | 8 | 9 | 10 | 11 | 12 |
|---|---|---|---|---|---|---|---|---|---|---|---|---|
| NUMBER OF SETS | 45 | 52 | 60 | 48 | 58 | 55 | 48 | 50 | 55 | 60 | 54 | 47 |

PAIR {AREA A, KEYWORD Kb}

| MONTH | 1 | 2 | 3 | 4 | 5 | 6 | 7 | 8 | 9 | 10 | 11 | 12 |
|---|---|---|---|---|---|---|---|---|---|---|---|---|
| NUMBER OF SETS | 3 | 2 | 5 | 10 | 15 | 5 | 150 | 180 | 140 | 50 | 10 | 2 |

INFORMATION PROVISION DEVICE, INFORMATION PROVISION METHOD, AND INFORMATION PROVISION PROGRAM

CROSS REFERENCE TO RELATED APPLICATIONS

This application is a National Stage of International Application No. PCT/JP2013/067869 filed Jun. 28, 2013, the contents of all of which are incorporated herein by reference in their entirety.

TECHNICAL FIELD

One aspect of the present invention relates to a device, a method and a program for providing information to help facility reservation.

BACKGROUND ART

Services to accept reservations for use of facilities are known. One example of such services is the Internet accommodation reservation system that is disclosed in Patent Literature 1 below.

CITATION LIST

Patent Literature

PTL 1: JP 2001-167162 A

SUMMARY OF INVENTION

Technical Problem

In general, a user makes a reservation after making sure that it fits into the schedule of the day to use the facility, and, in many cases, a reservation is made when the scheduled date of use approaches. However, if a user tries to make a reservation just before the scheduled date of use, there is a possibility that the facility is not available. Further, for a user who wants to select a desired plan among a wide variety of facility use plans, if the user tries to make a reservation at the time when the scheduled date of use approaches, it is likely that there is no available plan left. In view of those, it is convenient if it is possible to show a user when to make a reservation for use of a facility.

Solution to Problem

An information provision device according to one aspect of the present invention includes a receiving unit configured to receive search criteria containing an identifier of a target facility and a scheduled date of use, an extraction unit configured to extract reservation acceptance information of the target facility corresponding to a past determination target period based on the scheduled date of use in the search criteria by referring to a storage unit storing reservation acceptance information containing a facility, a scheduled date of use and a reservation accepted date, a setting unit configured to calculate a rate of decrease from an initial number of vacancies in the target facility during the past determination target period based on the extracted reservation acceptance information, and when there is a date of change when the number of vacancies has changed to be less than a specified threshold during the determination target period, set an estimated date for a reservation request for using a facility on the scheduled date of use in the search criteria by using the date of change, and a presentation unit configured to output the value set by the setting unit as estimate information for reservation request.

An information provision method according to one aspect of the present invention is an information provision device performed by an information provision device, the method including a receiving step of receiving search criteria containing an identifier of a target facility and a scheduled date of use, an extraction step of extracting reservation acceptance information of the target facility corresponding to a past determination target period based on the scheduled date of use in the search criteria by referring to a storage unit storing reservation acceptance information containing a facility, a scheduled date of use and a reservation accepted date, a setting step of calculating a rate of decrease from an initial number of vacancies in the target facility during the past determination target period based on the extracted reservation acceptance information, and when there is a date of change when the number of vacancies has changed to be less than a specified threshold during the determination target period, setting an estimated date for a reservation request for using a facility on the scheduled date of use in the search criteria by using the date of change, and a presentation step of outputting the value set in the setting step as estimate information for reservation request.

An information provision program according to one aspect of the present invention causes a computer to implement a receiving unit configured to receive search criteria containing an identifier of a target facility and a scheduled date of use, an extraction unit configured to extract reservation acceptance information of the target facility corresponding to a past determination target period based on the scheduled date of use in the search criteria by referring to a storage unit storing reservation acceptance information containing a facility, a scheduled date of use and a reservation accepted date, a setting unit configured to calculate a rate of decrease from an initial number of vacancies in the target facility during the past determination target period based on the extracted reservation acceptance information, and when there is a date of change when the number of vacancies has changed to be less than a specified threshold during the determination target period, set an estimated date for a reservation request for using a facility on the scheduled date of use in the search criteria by using the date of change, and a presentation unit configured to output the value set by the setting unit as estimate information for reservation request.

According to the above aspects, the rate of decrease from the initial number of vacancies in the target facility during the specified period in the past is calculated based on the past reservation information for the target facility, and it is determined whether the number of vacancies falls below a certain criterion during that period. When the number of vacancies falls below the criterion, the estimated date for requesting a reservation is set based on the date of change. In this manner, by determining the date (estimated date) that is supposed to be able to assure a request for a reservation in consideration of the tendency of decrease in the number of vacancies in the past, it is possible to show a user when to make a reservation for use of a facility.

In the information provision device according to another aspect, when the date of change does not exist, the setting unit may set a message indicating that last minute reservations are possible.

In the information provision device according to another aspect, the extraction unit may further extract reservation acceptance information of the target facility corresponding to a current determination target period based on the scheduled date of use in the search criteria, and the setting unit may calculate a difference between a change in the number of vacancies in the target facility during the current determination target period and a change in the number of vacancies during the past determination target period, and adjust the value set based on whether there is the date of change during the past determination target period, by using the difference.

In the information provision device according to another aspect, the setting unit may obtain a first date when the number of vacancies in the target facility has become the current value during the current determination target period, obtains a second date when the number of vacancies in the target facility has become the current value during the past determination target period, and adjust the set value by using a difference between the first and second dates.

In the information provision device according to another aspect, the extraction unit may extract the reservation acceptance information of the target facility for each of a plurality of past determination target periods, and the setting unit may count the number of days from the date of change to an end of the past determination target period for each of the plurality of past determination target periods, and set the estimated date based on the date of change during the past determination target period with the largest number of days.

The information provision device according to another aspect may further include a mode determination unit configured to determine a type of information to be set by the setting unit, and the reservation acceptance information may contain a facility use plan, a person who makes a reservation for the use plan, the scheduled date of use of the use plan, and the reservation accepted date, the search criteria may further contain a user ID, the mode determination unit may calculate a difference between the scheduled date of use and the reservation accepted date indicated by the reservation acceptance information corresponding to the user ID, determine to set the estimate information in reservation-first mode when the difference is less than a specified threshold, and determine to set the estimate information in plan-first mode when the difference is equal to or more than the threshold, in the reservation-first mode, the setting unit may set the estimate information for reservation request, and in the plan-first mode, the setting unit may calculate a rate of decrease from the total number of use plans in the target facility during the past determination target period based on the extracted reservation acceptance information, and when there is a date of change when a remaining number has changed to be less than a specified threshold during the determination target period, sets the estimated date allowing selection among a plurality of use plans by using the date of change.

The information provision device according to another aspect may further include an acquisition unit configured to, by referring to a storage unit storing data containing a location of a facility, a comment posted by a user of the facility, and a date of use of the facility by the user in association with one another, acquire a set of an area where the facility is located, a keyword extracted from the comment, and a period corresponding to the date of use, a counting unit configured to count the number of sets in each time during a specified period for each pair of the area and the keyword and thereby obtain a distribution of the number, and a presentation unit configured to output information about the pair having a burst time where the number is larger than in other times by a specified criterion or more, in association with the burst time, and the receiving unit may receive the search criteria generated based on a user operation performed in response to output of the information about the pair.

In the information provision device according to another aspect, the information about the pair may contain a date of an event indicated by the keyword, the receiving unit may receive search criteria containing a first scheduled date of use on or before the event date and a second scheduled date of use after the event date, the extraction unit and the setting unit may perform processing for each of the first and second scheduled dates of use, and the presentation unit may output the estimate information for each of the first and second scheduled dates of use.

Advantageous Effects of Invention

According to one aspect of the present invention, it is possible to show a user when to make a reservation for use of a facility.

BRIEF DESCRIPTION OF DRAWINGS

FIG. 17 is a view showing an example of distribution of the number of sets for a pair of an area and a keyword.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

First Embodiment

The functions and configuration of an information provision system 1 according to a first embodiment are described hereinafter with reference to FIGS. 1 to 5. The information provision system 1 is a computer system that shows a user the time until when it is advisable to make a reservation for use of a facility.

Figure 1:
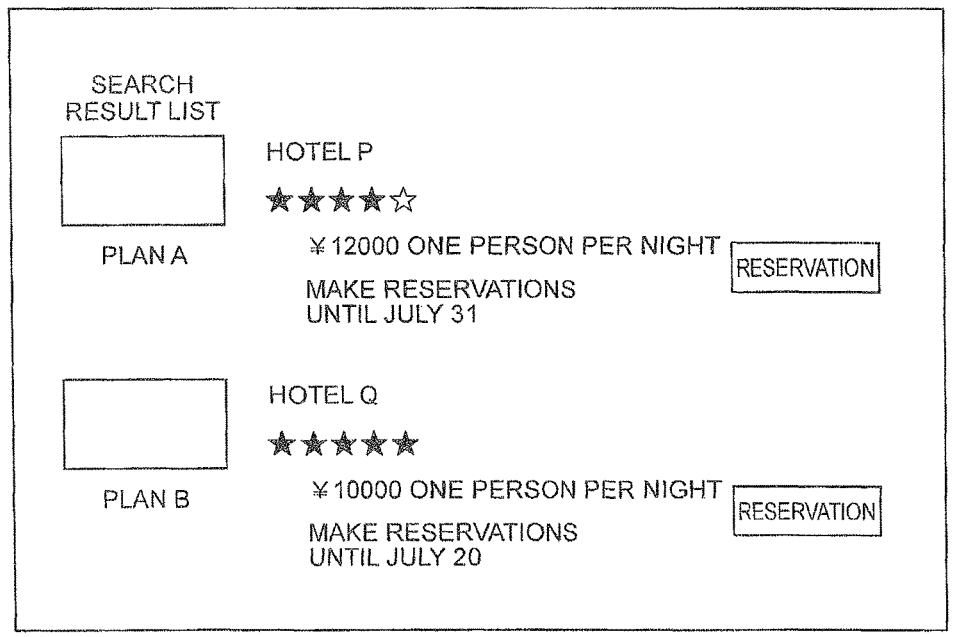
FIG. 1 is a view showing an example of estimate information provided by an information provision system according to an embodiment.
Figure 2:
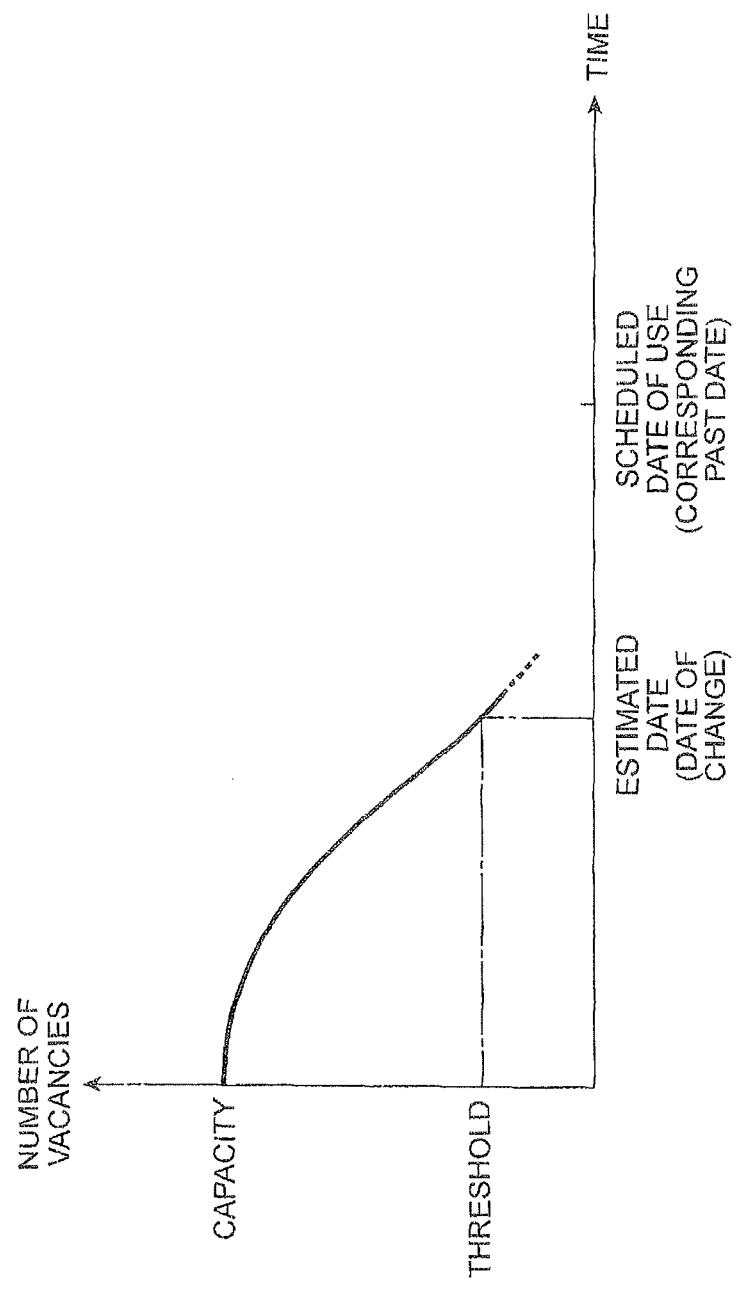
FIG. 2 is a view showing a concept of prediction of an estimated date.

FIG. 1 shows an example of a screen provided from an information provision system 1 to a user. This screen is a list of search results for accommodation facilities and accommodation plans, and a guide for reservations such as "Make reservations until July 31" is shown for each plan of each facility. The estimated date for a reservation request (which is referred to hereinafter simply as "estimated date") is an estimated value indicating that, if a request for a reservation is made until the date, the request would be accepted for sure. Because the estimated date is the day on which vacancies are left in facilities, the system 1 does not estimate the time when vacancies run out. With such estimate information, a user can know when to make a reservation for use of a facility.

The information provision system 1 predicts the estimated date based on the tendency of decrease in the number of vacancies in the past. The concept of the prediction is described with reference to FIG. 2

The information provision system 1 sets the past date corresponding to the date (the scheduled date of use) when a user desires to use a facility as the corresponding past date. Then, the information provision system 1 sets a specified period starting from the point of time when no reservation is made for a facility (when the number of vacancies equals the capacity) and ending at the corresponding past date as a determination target period to learn the rate of decrease in the number of vacancies. As a matter of course, the determination target period is a time interval in the past, and its length may be set arbitrarily (for example, one month, two months etc.).

Next, the information provision system 1 calculates the rate of decrease in the number of vacancies of a facility during the determination target period, and specifies the date when the number of vacancies falls below a specified threshold as the date of change. As a matter of course, the date of change is a date in the past. Then, the information provision system 1 determines the estimated date for a reservation request based on the date of change. The estimated date is a date in the future.

Figure 3:
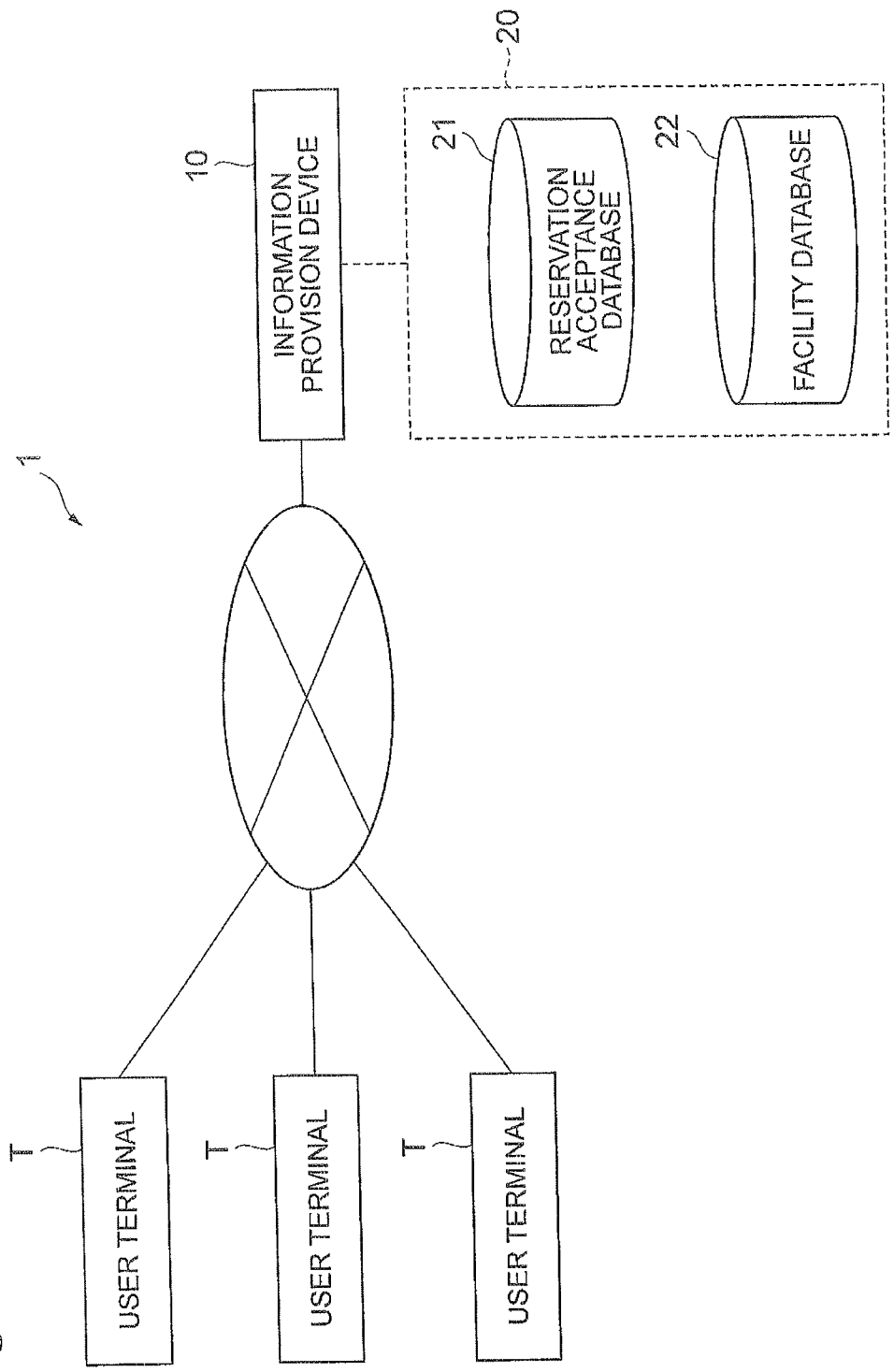
FIG. 3 is a view showing an overall configuration of an information provision system according to first to third embodiments.

As shown in FIG. 3, the information provision system 1 includes user terminals T, an information provision device 10, and databases (storage units) 20. The user terminals T and the information provision device 10 are connected through a network such as the Internet. The information provision device 10 can access the databases 20 through a network such as the Internet or a private line. Although three user terminals T are shown in FIG. 3, the number of user terminals T is not particularly limited.

The user terminals T are computers that are owned by users. The variety of the user terminals T is not particularly limited, and it may be a stationary or portable personal computer, or a mobile terminal such as an advanced mobile phone (smart phone), a cellular phone or a personal digital assistant (PDA), for example.

The databases 20 are a group of various kinds of databases required in the information provision system 1. Each of the databases may be placed in any place, and the databases may be located together in one place or located in different places. The administrator of each database may be the same or different.

A reservation acceptance database 21 is a device that stores a history of receiving requests for reservations for use of facilities from users. Examples of facilities include accommodation facilities, commercial facilities, public facilities, leisure facilities and the like, though the variety of facilities is not particularly limited.

When a user requests a reservation for use of a facility through a facility reservation site and the request is accepted, that is, when it is determined that a reservation is possible, a server that manages the site generates reservation acceptance information and stores it into the reservation acceptance database 21. For example, when a user selects an accommodation, the period of use, the number of guests, an accommodation plan and the like and presses a Send button on an accommodation reservation site to send a request for a reservation to a specified server, the server performs a reservation acceptance process and stores the reservation acceptance information into the reservation acceptance database 21. Note that, because the present invention is based on the assumption that a certain amount of reservation acceptance information has been accumulated, the procedure to generate and store the reservation acceptance information is not particularly limited as long as the reservation acceptance information is eventually stored in the reservation acceptance database 21.

A record of the reservation acceptance information contains the following items in this embodiment. Note that, however, the reservation acceptance information may contain other items. Further, because a user ID is not used in this embodiment, this item can be omitted.

User ID that identifies a person who makes a reservation; Facility ID that identifies a facility reserved by a user; Number of uses, this number being indicated by the number of rooms, the number of tables, the number of seats and the like, for example; Scheduled date of use requested for a reservation; Date when a request for a reservation is received (reservation accepted date)

As for the scheduled date of use, when the period of use is two days or more as in the case of accommodations, this item is recorded in any format that can specify the start date and the end date of use. For example, the scheduled date of use may be recorded in the format such as "Jun. 1, 2013 to Jun. 3, 2013" or "two nights from Jun. 1, 2013". Alternatively, the same number of records as the number of days of use may be generated for one reservation and stored into the reservation acceptance database 21.

The facility database 22 is a device that stores information of facilities. In this embodiment, a record of the facility information at least contains the following items. The facility information may contain other facility attributes such as a telephone number, an address, the URL (Uniform Resource Locator) of a homepage, and accommodation plans.

Facility ID; Facility name; Capacity (the total number of vacancies), this number being indicated by the number of rooms, the number of tables, the number of seats and the like, for example.

The structures of the respective databases and records are not limited to those described above, and the databases may be normalized or made redundant by an arbitrary policy. For example, each record of reservation acceptance information may contain the number of vacancies of a facility after accepting a reservation indicated by the record as one item.

Figure 4:
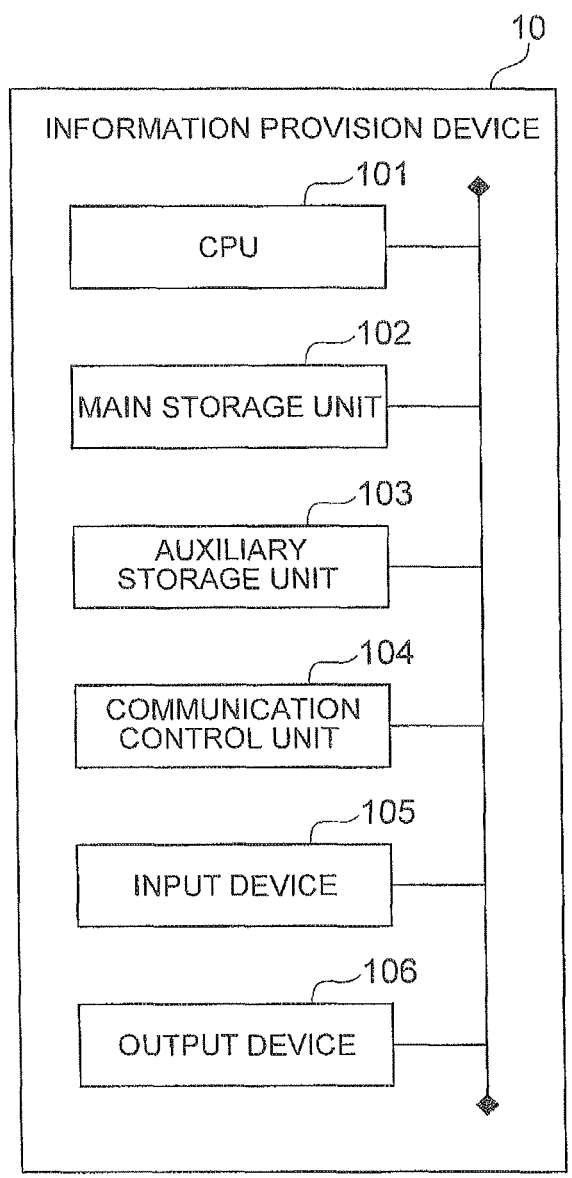
FIG. 4 is a view showing a hardware configuration of an information provision device according to an embodiment.

The information provision device 10 is described hereinbelow. FIG. 4 shows a hardware configuration of the information provision device 10. The information provision device 10 includes a CPU 101 that executes an operating system, an application program and the like, a main storage unit 102 such as ROM and RAM, an auxiliary storage unit 103 such as a hard disk, a communication control unit 104 such as a network card or a wireless communication module, an input device 105 such as a keyboard and a mouse, and an output device 106 such as a display.

The functional elements of the information provision device 10, which are described later, are implemented by loading given software onto the CPU 101 or the main storage unit 102, making the communication control unit 104, the input device 105, the output device 106 and the like operate under control of the CPU 101, and performing reading and writing of data in the main storage unit 102 or the auxiliary storage unit 103. The data and databases required for processing are stored in the main storage unit 102 or the auxiliary storage unit 103.

Note that the information provision device 10 may be composed of one computer or may be composed of a plurality of computers.

Figure 5:
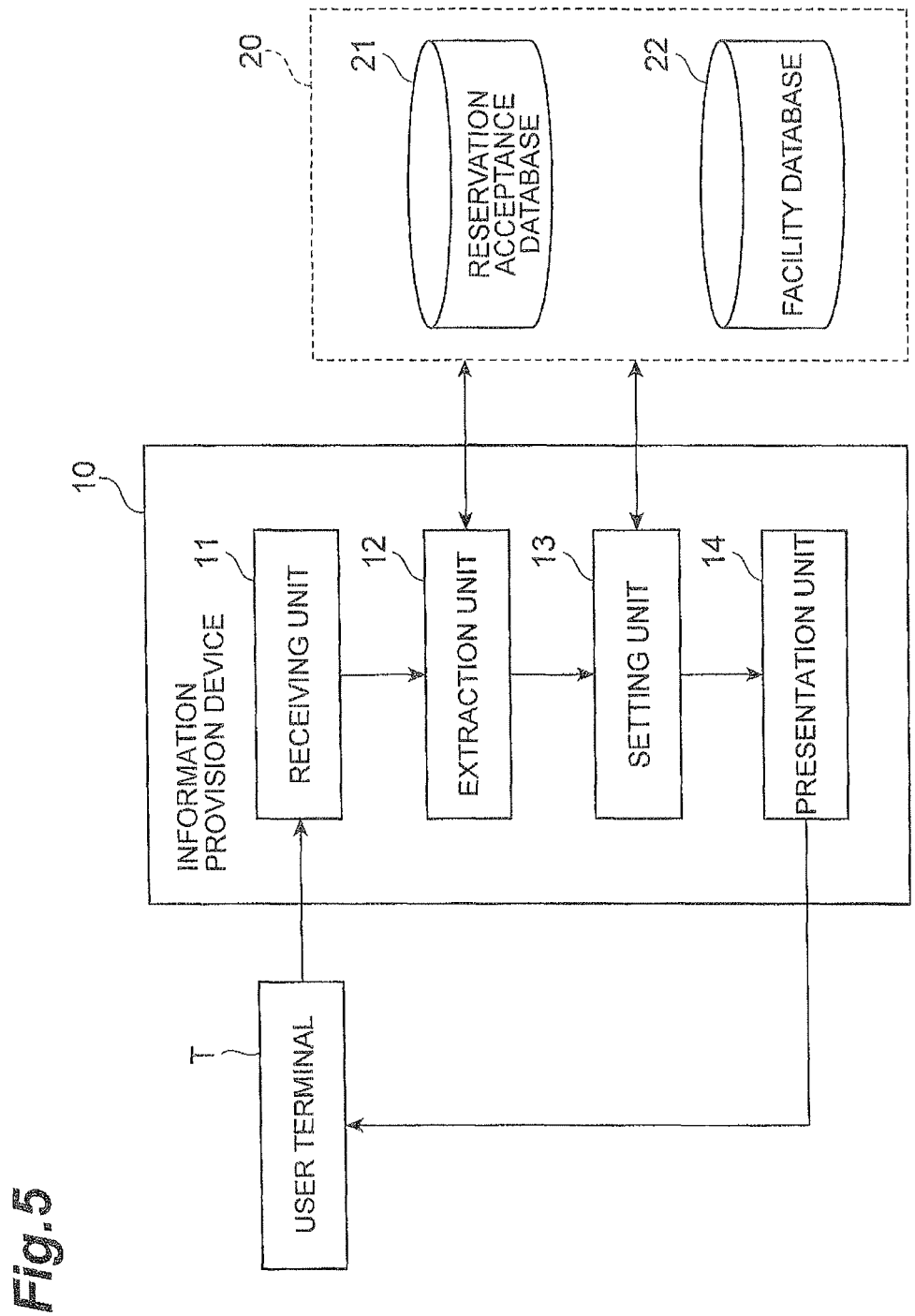
FIG. 5 is a block diagram showing a functional configuration of an information provision device according to first and second embodiments.

As shown in FIG. 5, the information provision device 10 includes, as functional elements, a receiving unit 11, an extraction unit 12, a setting unit 13, and a presentation unit 14.

The receiving unit 11 is a functional element that receives search criteria containing an identifier of a facility for which the estimated date is to be obtained (which is referred to hereinafter as "target facility ID") and the scheduled date of use. In this embodiment, the receiving unit 11 receives the search criteria specified by a user from the user terminal T; however, the receiving unit 11 may receive search criteria that are automatically set with a certain standard in the information provision device 10. The number of target facility IDs may be one or two or more. The receiving unit 11 outputs the search criteria to the extraction unit 12.

The extraction unit 12 is a functional element that extracts from the reservation acceptance database 21 the past reservation acceptance information that matches the search criteria.

First, the extraction unit 12 sets the corresponding past date and the determination target period. The way to set the corresponding past date is not limited. For example, the extraction unit 12 may set the date of one year before the scheduled date of use in the search criteria as the corresponding past date. When the scheduled date of use in the search criteria is "Aug. 10, 2013", the extraction unit 12 sets the corresponding past date as "Aug. 10, 2012". In this case, when the starting point of the determination target period is "Jun. 1, 2012", the extraction unit 12 sets the determination target period to "Jun. 1, 2012 to Aug. 10, 2012".

The extraction unit 12 may set a plurality of determination target periods within the range of two years or more. When the scheduled date of use in the search criteria is "Aug. 10, 2013", the extraction unit 12 sets the two corresponding past dates "Aug. 10, 2012" and "Aug. 11, 2011". In this case, the extraction unit 12 sets the two determination target periods "Jun. 1, 2012 to Aug. 10, 2012" and "Jun. 1, 2011 to Aug. 10, 2011".

In consideration of the fact that a day of the week is different every year for the same date, the extraction unit 12 may set the date whose day of the week is the same as the scheduled date of use in the search criteria and whose month and day are the closest to those of the scheduled date of use as the corresponding past date. For example, when the scheduled date of use in the search criteria is "Aug. 10, 2013", it is Saturday. Because Saturday that is the closest to Aug. 10, 2012 is Aug. 11, 2012, the corresponding past date is "Aug. 11, 2012". In this case, if the determination target period is two months for the sake of convenience, the determination target period is "Jun. 11, 2012 to Aug. 11, 2012". In the case of setting the determination target period also for the year 2011, because Saturday that is the closest to Aug. 10, 2011 is Aug. 13, 2011, the period is "Jun. 13, 2011 to Aug. 13, 2011".

Then, the extraction unit 12 extracts, for each target facility, the reservation acceptance information where the facility ID has a match, the scheduled date of use includes the corresponding past date, and the reservation accepted date is within the determination target period from the reservation acceptance database 21. The extraction unit 12 then outputs the reservation acceptance information of each target facility to the setting unit 13.

The setting unit 13 is a functional element that sets estimate information to be transmitted to the user terminal T. The setting unit 13 calculates the rate of decrease from the initial number of vacancies in the target facility during the determination target period based on the extracted reservation acceptance information, and determines whether there is the date of change when the number of vacancies has changed to be less than a specified threshold during the determination target period. When the date of change exists, the setting unit 13 sets the estimated date, and when the date of change does not exist, the setting unit 13 sets a message indicating that last minute reservations are possible. The setting unit 13 performs this processing for each target facility.

The setting unit 13 has a threshold that is used for the determination in advance. The threshold is the number of vacancies at the point of time when it is assumed to be preferable to make a reservation early because the vacancies of the facility have become scarce. The setting unit 13 may have a threshold that is set for each facility or may have a threshold that is common among a plurality of facilities.

Processing for one target facility is described hereinafter. First, the setting unit 13 accesses the facility database 22 and refers to the facility information of the target facility, and thereby acquires the capacity of target facility as the initial number of vacancies. Further, the setting unit 13 arranges the reservation acceptance information of the target facility in ascending order of the reservation accepted date.

After that, the setting unit 13 performs the processing of reducing the number of vacancies in the target facility sequentially from the first record of the reservation acceptance information. In the processing of the first record, the setting unit 13 sets the capacity as the initial value of the number of vacancies and then subtracts the number of uses indicated by the record from the number of vacancies. When the number of vacancies after the subtraction is less than a threshold, the setting unit 13 acquires the reservation accepted date indicated by the record as the date of change when the number of vacancies has changed to be less than a specified threshold and ends the processing for the current target facility. On the other hand, when the number of vacancies after the subtraction is equal to or more than the threshold, the setting unit 13 ends the processing for the first record and proceeds to processing of the next record. The processing of the second and subsequent records is the same as that of the first record. The setting unit 13 repeats this processing until acquiring the date of change or until finishing processing the final record for one target facility.

In the case where the date of change exists, the setting unit 13 counts the number of days from the date of change to the corresponding past date, and sets the date which is earlier than the scheduled date of use by that number of days as the estimated date for the target facility. For example, when the scheduled date of use is "Aug. 10, 2013", the corresponding past date is "Aug. 11, 2012", and the date of change is "Jul. 15, 2012", the number of days from the date of change to the corresponding past date is 27, and therefore the estimated date is "Jul. 14, 2013". Alternatively, the setting unit 13 may set the current or future date where the month and day are the same as those of the date of change as the estimated date. In this case, when the scheduled date of use is "Aug. 10, 2013", the corresponding past date is "Aug. 11, 2012", and the date of change is "Jul. 15, 2012", the estimated date is "Jul. 15, 2013".

On the other hand, in the case where the date of change does not exist, the setting unit 13 sets a message indicating that last minute reservations are possible for the target facility, without setting the estimated date. "Last minute reservations are possible" means that a user can request a reservation at any time (for example, until the day before the scheduled date of use) with no concern about the number of days to the scheduled date of use.

In the case where a plurality of determination target periods are set, the setting unit 13 determines whether there is the date of change for each of the determination target periods, counts the number of days to the corresponding past date for each of one or more acquired dates of a change, and selects the determination target period with the largest number of days. Then, the setting unit 13 sets the date which is earlier than the scheduled date of use, by the number of days from the date of change to the corresponding past date during the selected determination target period, as the estimated date for the target facility. When the date of change is not acquired, the setting unit 13 sets a message indicating that last minute reservations are possible for the target facility.

For example, it is assumed that the scheduled date of use is "Aug. 10, 2013", the corresponding past date and the date of change for the determination target period A is "Aug. 11, 2012" and "Jul. 15, 2012", respectively, and the corresponding past date and the date of change for the determination target period B is "Aug. 13, 2011" and "Jul. 10, 2011", respectively. In this case, the number of days from the date of change to the corresponding past date is 27 in the determination target period A, and it is 34 in the determination target period B. Thus, the setting unit 13 sets the estimated date to "Jul. 7, 2013".

As described above, by setting the point of time that is farthest away from the scheduled date of use as the estimated date, it is possible to assure the acceptance of a request for a reservation more reliably.

After the setting unit 13 performs the processing of setting the estimated date or the message for each of the target facilities, it outputs those estimate information to the presentation unit 14.

The presentation unit 14 is a functional element that provides a user with the estimate information indicating the time until when it is advisable to make a reservation for a target facility. The presentation unit 14 creates a web page on which the estimate information is shown and transmits it to the user terminal T, and the user terminal T displays the web page. The estimate information may be displayed in ascending order or descending order of the estimated date, which is, the order of closeness or farness of the estimated date to or from the current point of time. A user can thereby know when to make a reservation for each facility. From the screen of FIG. 1, a user can know that it is preferable to make a reservation for the plan A of the hotel P until July 31, for example, and it is possible to press a Reservation button to make a reservation for the accommodation plan. On such a screen, the message "available at any time" indicating that last minute reservations are possible can be displayed.

A specific technique for creating a screen is not limited. The presentation unit 14 may create a screen using a given script or program language and transmit data of the screen to the user terminal T.

Figure 6:
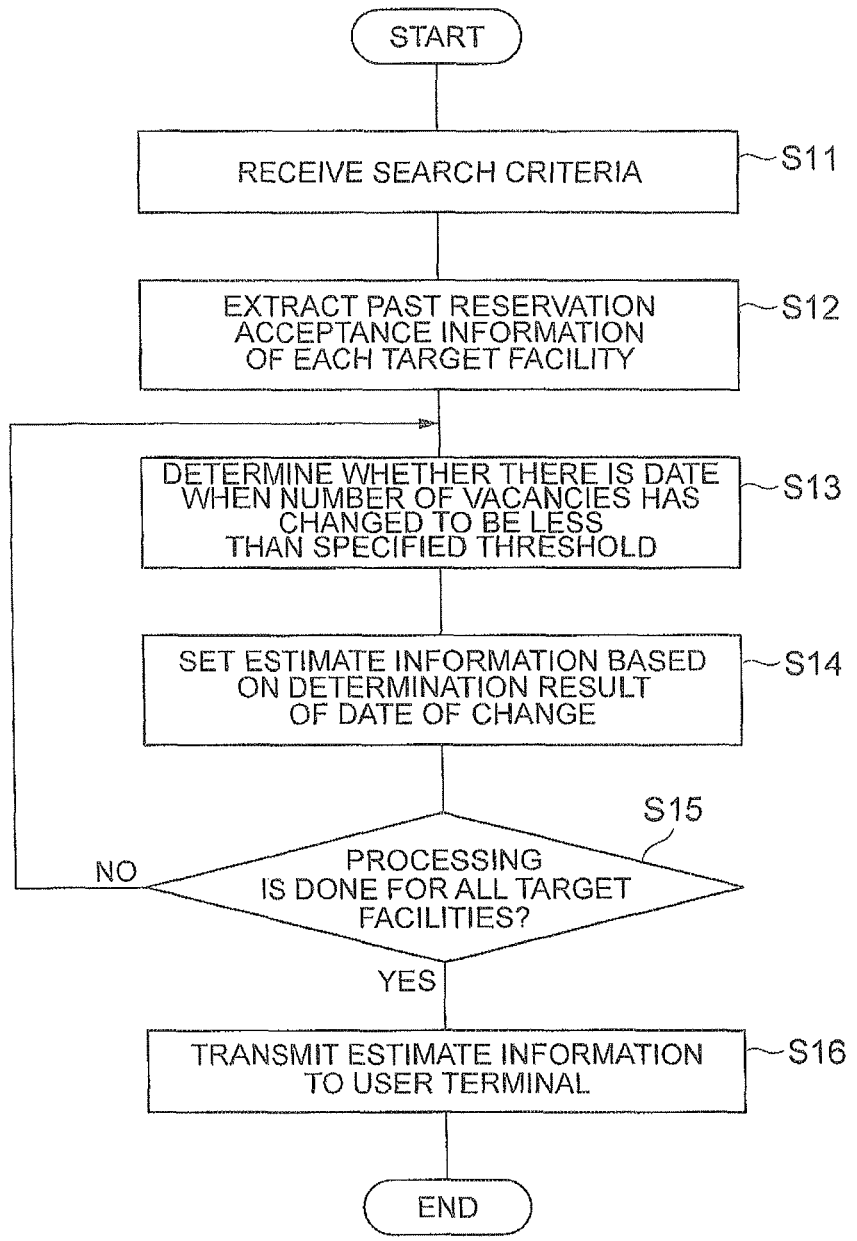
FIG. 6 is a flowchart showing an operation of the information provision device according to the first embodiment.

The operation of the information provision device 10 is described, and further an information provision method according to this embodiment is described hereinafter with reference to FIG. 6.

First, the receiving unit 11 receives search criteria containing a target facility ID and the scheduled date of use (Step S11, receiving step).

Next, the extraction unit 12 extracts the past reservation acceptance information that match the search criteria (Step S12, extraction step). To be specific, the extraction unit 12 sets the corresponding past date and the determination target period based on the scheduled date of use. The extraction unit 12 then extracts, for each target facility, the reservation acceptance information where the facility ID has a match, the scheduled date of use includes the corresponding past date, and the reservation accepted date is within the determination target period, from the reservation acceptance database 21.

Then, the setting unit 13 sets when to make reservations for each target facility (setting step). To be specific, the setting unit 13 calculates the rate of decrease from the initial number of vacancies in one target facility during the determination target period based on the reservation acceptance information, and determines whether there is the date of change when the number of vacancies has changed to be less than a specified threshold during the determination target period (Step S13). The setting unit 13 then sets the estimate information based on the determination result of the date of change (Step S14). To be specific, when the date of change exists, the setting unit 13 sets the estimated date based on the scheduled date of use in the search criteria and the date of change, and when the date of change does not exist, it sets a message indicating that last minute reservations are possible. The setting unit 13 performs this processing for all of the target facilities (see Step S15).

After that, the presentation unit 14 transmits the set estimate information to the user terminal T (Step S16, presentation step). The user terminal T displays the estimate information, and a user can thereby know the time until when it is preferable to make a reservation for each target facility.

Figure 7:
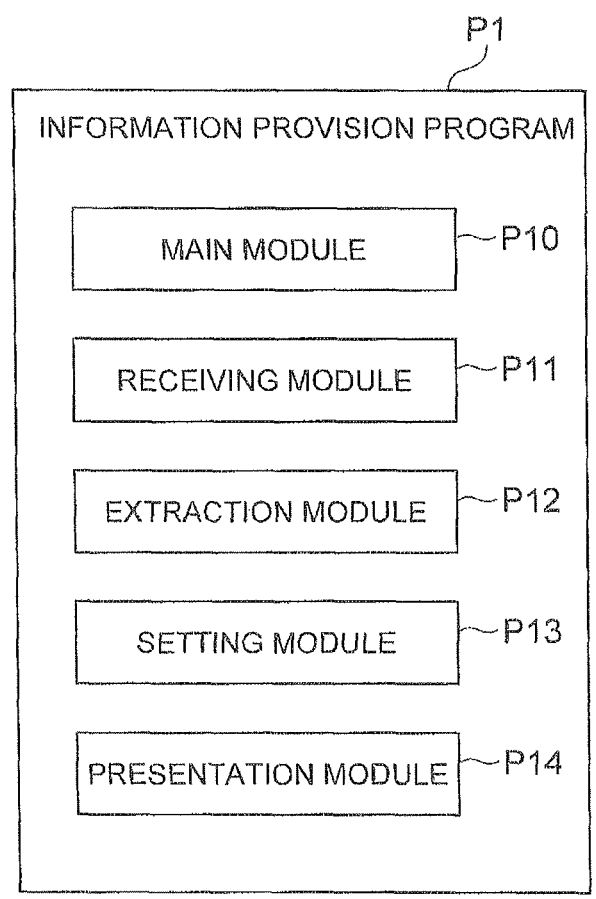
FIG. 7 is a block diagram showing a configuration of an information provision program according to the first and second embodiments.

An information provision program P1 for implementing the information provision device 10 is described hereinafter with reference to FIG. 7.

The information provision program P1 includes a main module P10, a receiving module P11, an extraction module P12, a setting module P13, and a presentation module P14.

The main module P10 is a part that exercises control over the information provision function. The functions implemented by executing the receiving module P11, the extraction module P12, the setting module P13 and the presentation module P14 are equal to the functions of the receiving unit 11, the extraction unit 12, the setting unit 13 and the presentation unit 14 described above, respectively.

The information provision program P1 may be provided in the form of being recorded in a static manner on a tangible recording medium such as CD-ROM or DVD-ROM or semiconductor memory, for example. Further, the information provision program P1 may be provided as a data signal superimposed onto a carrier wave through a communication network.

As described above, according to this embodiment, the rate of decrease from the initial number of vacancies in the target facility during the specified period in the past is calculated based on the past reservation information for the target facility, and it is determined whether the number of vacancies falls below a certain criterion during that period. When the number of vacancies falls below the criterion, the estimated date for requesting a reservation is calculated based on the date of change, and otherwise, a message indicating that last minute reservations are possible is output. In this manner, by determining the date (estimated date) that is supposed to be able to assure a request for a reservation in consideration of the tendency of decrease in the number of vacancies in the past, it is possible to show a user when to make a reservation for use of a facility.

Although it is possible to know whether reservations can be made or not by seeing the number of vacancies, because a user generally makes a reservation after fixing the schedule, the user does not necessarily request a reservation immediately after seeing the number of vacancies. However, there is a possibility that vacancies of a desired facility run out before the user makes a final decision. Because the pace of decrease (the rate of decrease) in the number of vacancies cannot be obtained merely by seeing the number of vacancies at a certain point of time, it is not possible to calculate when to make reservations. To solve such a technical problem, a change in the number of vacancies during the past period corresponding to the scheduled date of use is calculated, and the estimate information is set based on the change in this embodiment.

Second Embodiment

The information provision device 10 may modify the estimated date calculated based on the past record in consideration of the availability of this year and then presents the modified estimated date to a user. Hereinafter, points different from the first embodiment are particularly described, and the same points as in the first embodiment are not redundantly described.

The extraction unit 12 first extracts the past reservation acceptance information in the same manner as in the first embodiment. Further, the extraction unit 12 extracts, for each target facility, the reservation acceptance information where the facility ID has a match and the scheduled date of use includes the date indicated by the search criteria from the reservation acceptance database 21. This processing means to acquire the availability of this year (of the current time) in the target facility. In this manner, the extraction unit 12 extracts two types of reservation acceptance information for each target facility and outputs the information to the setting unit 13.

The setting unit 13 performs the following processing for each target facility. First, the setting unit 13 accesses the facility database 22 to acquire the capacity of the target facility. Further, the setting unit 13 arranges each of the input reservation acceptance information in the past and in this year in ascending order of the reservation accepted date.

Then, the setting unit 13 performs the processing of reducing the number of vacancies in the target facility during the determination target period of this year sequentially from the first record of the reservation acceptance information of this year, and thereby acquires the number of vacancies K of the current time and the date (reservation accepted date) Dc when the number of vacancies has become the value K.

Then, the setting unit 13 performs the processing of reducing the number of vacancies in the target facility sequentially from the first record of the reservation acceptance information in the past in order to obtain a change in the number of vacancies of the target facility during the determination target period in the past, and thereby acquires the date (reservation accepted date) Dp when the number of vacancies has become the value K.

Figure 8:
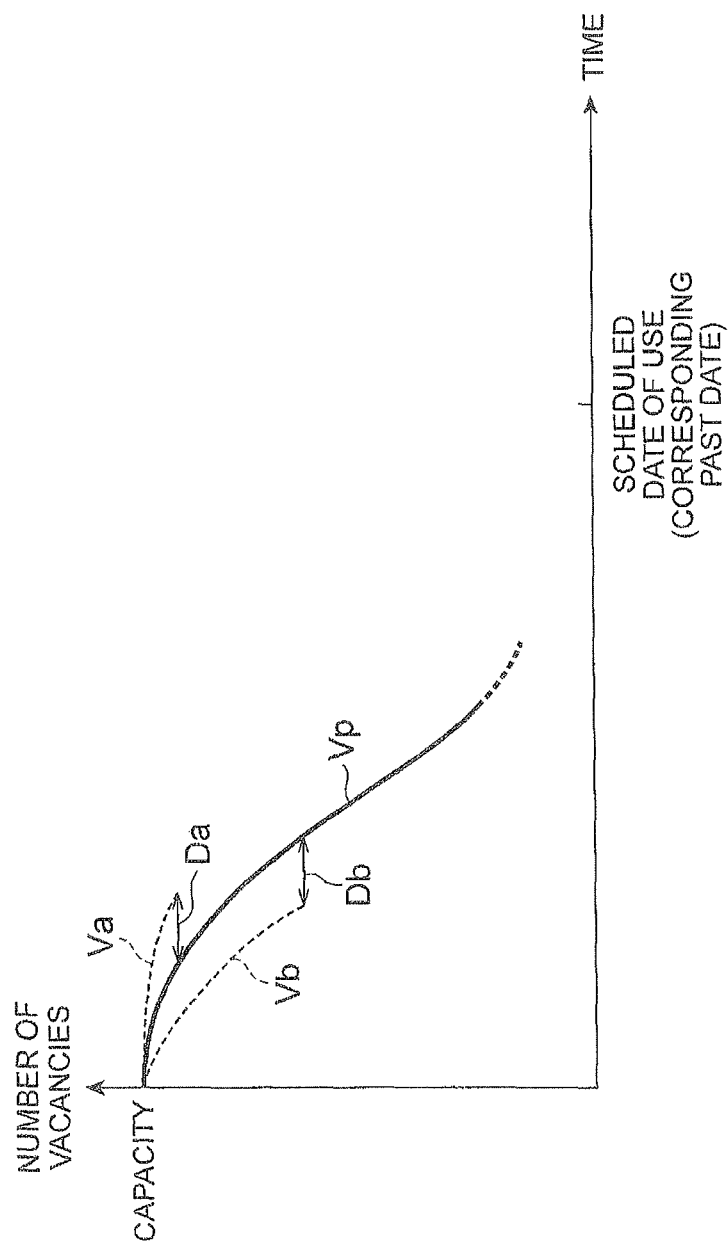
FIG. 8 is a view showing a concept of adjustment of an estimated date.

After that, the setting unit 13 calculates a difference D between the two dates Dc and Dp. FIG. 8 shows an example of the difference. In this figure, a change in the number of vacancies in the past determination target period is indicated by the solid line Vp, and a change in the number of vacancies in the current determination target period is indicated by the dotted lines Va and Vb, which show two patterns. The difference Da shows that the pace of decrease in the number of vacancies of this year is slower than in the past, and the difference Db shows that the pace of decrease in the number of vacancies of this year is faster than in the past.

Then, the setting unit 13 obtains a change in the number of vacancies of the target facility during the past determination target period in the same manner as in the first embodiment, and determines whether there is the date of change when the number of vacancies has changed to be less than a threshold.

In the case where the date of change exists, the setting unit 13 counts the number of days from the date of change to the corresponding past date, and provisionally sets the date which is earlier than the scheduled date of use by that number of days as the estimated date for the target facility. This processing is the same as in the first embodiment. Then, the setting unit 13 applies the difference D to the provisional estimated date and thereby determines the final estimated date. If the pace of decrease in the number of vacancies of this year is slower than in the past, the final estimated date is later than the provisional date, and if the pace of decrease is faster than in the past, the final estimated date is earlier than the provisional date.

For example, when the scheduled date of use is "Aug. 10, 2013", the corresponding past date is "Aug. 11, 2012", and the date of change is "Jul. 15, 2012", the provisional estimated date is "Jul. 14, 2013" as described above. If the pace of decrease of this year is three days slower than in the past, the setting unit 13 shifts the estimated date to "Jul. 17, 2013", and if the pace of decrease of this year is three days faster than in the past, the setting unit 13 shifts the estimated date to "Jul. 11, 2013".

In the case where the date obtained by shifting the provisional estimated date by the difference D is the same or later than the scheduled date of use in the search criteria, the setting unit 13 sets a message indicating that last minute reservations are possible for the target facility.

On the other hand, in the case where the date of change does not exist for a certain target facility, the setting unit 13 may refrain from calculating the estimated date as in the first embodiment, or may set the estimated date only when the pace of decrease of this year is faster than in the past. When setting the estimated date, the setting unit 13 obtains the final estimated date by shifting the scheduled date of use in the search criteria by the difference D. Specifically, the setting unit 13 sets the scheduled date of use in the search criteria as the provisional estimated date and then obtains the final estimated date. For example, when the scheduled date of use is "Aug. 10, 2013", and if the pace of decrease of this year is three days faster than in the past, the estimated date is "Aug. 7, 2013".

Figure 9:
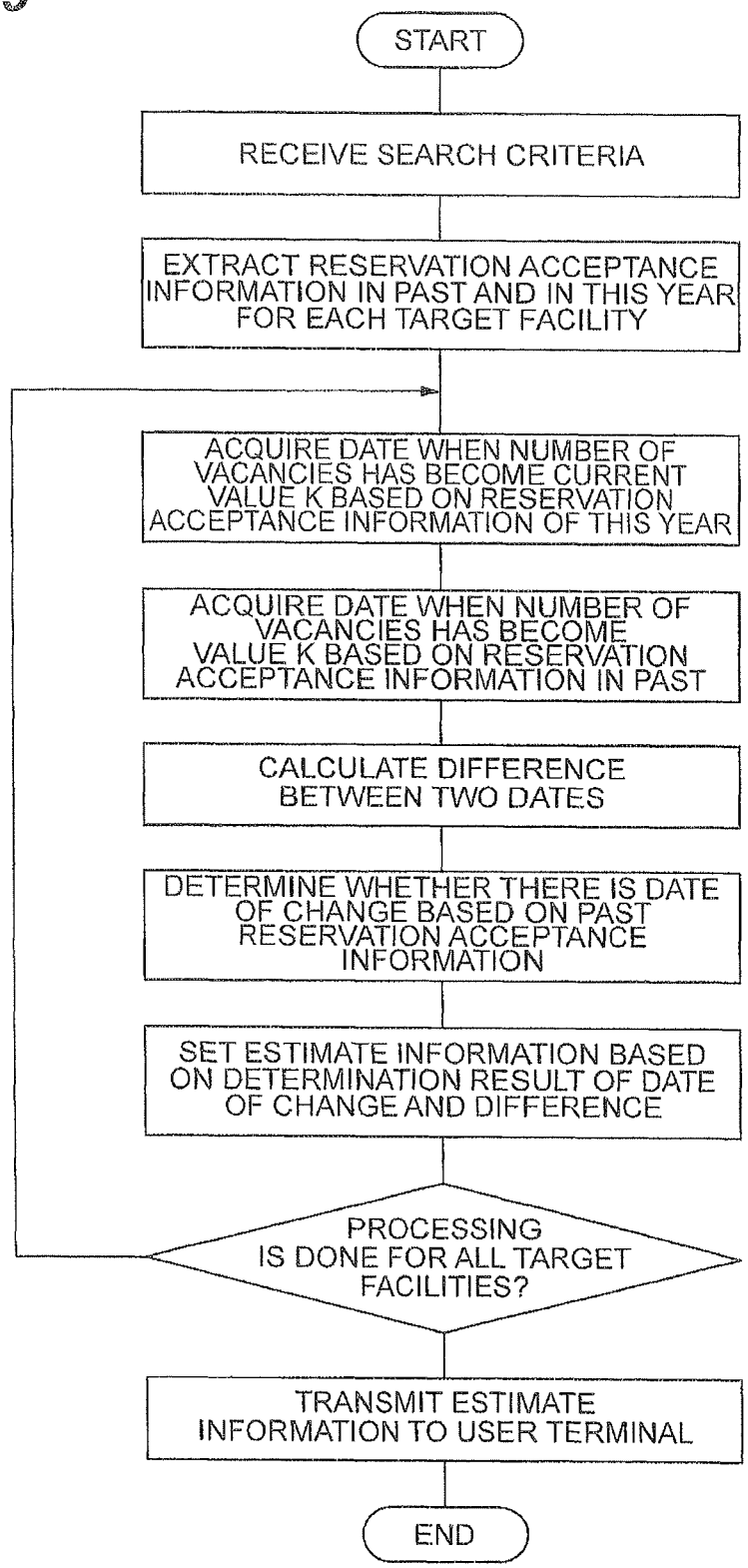
FIG. 9 is a flowchart showing an operation of the information provision device according to the second embodiment.

An information provision method according to this embodiment is described hereinafter with reference to FIG. 9.

First, the receiving unit 11 receives search criteria containing a target facility ID and the scheduled date of use (Step S21, receiving step).

Next, the extraction unit 12 extracts the reservation acceptance information, in the past and in this year that match the search criteria (Step S22, extraction step). The criteria for extracting the past reservation acceptance information is the same as in the first embodiment. For the reservation acceptance information of this year, the extraction unit 12 extracts from the reservation acceptance database 21 the reservation acceptance information where the facility ID has a match and the scheduled date of use includes the date indicated by the search criteria.

Then, the setting unit 13 sets when to make reservations for each target facility (setting step). To be specific, the setting unit 13 obtains the date when the number of vacancies has become the current value K based on the reservation acceptance information of this year (Step S23), obtains the date when the number of vacancies has become the value K based on the reservation acceptance information in the past (Step S24), and then calculates a difference between those two dates (Step S25). The setting unit 13 then determines whether there is the date of change based on the reservation acceptance information in the past (Step S26), and then sets the estimate information (the estimated date or the message indicating that last minute reservations are possible) based on the determination result of the date of change and the difference (Step S27). The setting unit performs this processing for all of the target facilities (see Step S28). Finally, the presentation unit 14 transmits the estimate information to the user terminal (Step S29).

As described above, in this embodiment also, it is possible to show a user when to make a reservation for use of a facility. In addition, in this embodiment, a change in the number of vacancies during the current determination target period is obtained, and the estimated date obtained from a change in the number of vacancies during the past determination target period is adjusted based on the current tendency of decrease in the number of vacancies, and it is thereby possible to show a user an appropriate estimated date.

Third Embodiment

An information provision device 30 according to a third embodiment determines whether a user tends to make a reservation for a facility only after the scheduled date of use approaches or tends to select one among many use plans and make a reservation at an early time, and changes the type of the estimate information according to the determination result. To be specific, for a user who tends to make a reservation for a facility when the scheduled date of use approaches, the information provision device 30 shows the estimated date for a reservation request in the same manner as in the first and second embodiments. On the other hand, for a user who tends to make a reservation for a facility at an early time, the information provision device 30 shows the estimated date (estimated date for plan selection) on which a desired plan can be selected among a certain large number of use plans. In this embodiment, it is assumed that each facility offers a plurality of use plans. An example of use plans is accommodation plans of a hotel, though the variety of use plans is not limited thereto. Hereinafter, points different from the first embodiment are particularly described, and the same points as in the first embodiment are not redundantly described.

In this embodiment, each record of the reservation acceptance information in the reservation acceptance database 21 further contains a plan ID that uniquely specifies a use plan reserved by a user. By a combination of a facility ID and a plan ID, it is possible to specify the facility and the use plan reserved by a user.

Further, each record of the facility information in the facility database 22 contains plan information about a plurality of use plans. Each plan information contains a plan ID and the initial number of vacancies. Thus, by referring to the facility information, it is possible to know the number of plans offered by each facility and the initial number of vacancies of each plan.

Figure 10:
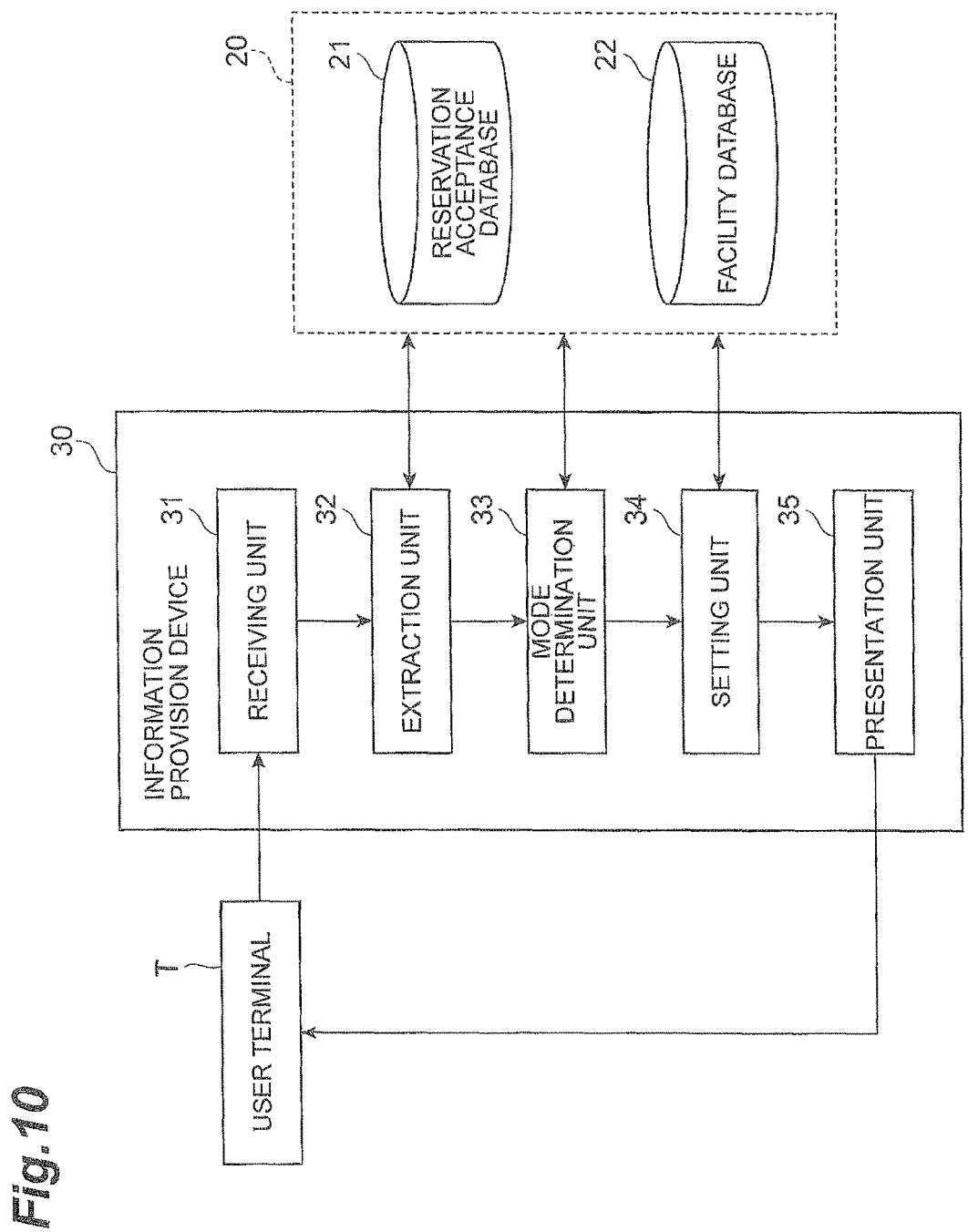
FIG. 10 is a block diagram showing a functional configuration of an information provision device according to the third embodiments.

The functions of the information provision device 30 are described hereinafter based on the assumption that the databases have the above structures. As shown in FIG. 10, the information provision device 30 includes, as functional elements, a receiving unit 31, an extraction unit 32, a mode determination unit 33, a setting unit 34, and a presentation unit 35.

The receiving unit 31 receives from the user terminal T search criteria containing a target facility ID, the scheduled date of use and a user ID, and outputs the search criteria to the extraction unit 32.

The extraction unit 32 extracts from the reservation acceptance database 21 the past reservation acceptance information corresponding to the target facility ID and the scheduled date of use. The extraction processing is the same as in the first embodiment.

The mode determination unit 33 is a functional element that determines the type of estimate information to be shown to a user. The mode determination unit 33 determines to show the estimate information for reservation request to a user who tends to make a reservation for a facility when the scheduled date of use approaches. This case is referred to hereinafter as "reservation-first mode". On the other hand, for a user who tends to make a reservation for a facility at an early time, the mode determination unit 33 determines to show the estimate information for plan selection. This case is referred to hereinafter as "plan-first mode".

The mode determination unit 33 reads from the reservation acceptance database 21 the reservation acceptance information corresponding to the user ID in the search criteria, calculates a difference between the scheduled date of use and the reservation accepted date for each record, and calculates the statistics (for example, the average, median etc.) of the differences. When the statistics are less than a specified threshold, the mode determination unit 33 determines to perform processing in the reservation-first mode, and when the statistics are equal to or more than the threshold, the mode determination unit 33 determines to perform processing in the plan-first mode. Then, the mode determination unit 33 outputs the determination result together with the search criteria to the setting unit 34.

The setting unit 34 performs one of the two types of setting processing according to the determined mode. The processing in the reservation-first mode is the same as that in the first or second embodiment and thus not redundantly described. The processing in the plan-first mode is described hereinbelow.

The setting unit 34 has in advance a threshold that is used for the date of change in the number of plans. The threshold is the number of plans at the point of time when a certain large number of use plans are left. The setting unit 34 may have a threshold that is set for each facility or may have a threshold that is common among a plurality of facilities.

Processing for one target facility is described hereinafter. First, the setting unit 34 accesses the facility database 22 and refers to the facility information of the target facility, and thereby acquires the total number of use plans and the initial number of vacancies of each use plan. Further, the setting unit 34 arranges the input reservation acceptance information in ascending order of the reservation accepted date.

After that, the setting unit 34 performs the processing of reducing the number of vacancies of each use plan in the target facility sequentially from the first record of the reservation acceptance information. In the processing of the first record, the setting unit 34 subtracts the number of uses of the use plan indicated by the record from the corresponding initial number of vacancies. When the number of vacancies after the subtraction becomes 0, the setting unit 34 sets the number obtained by subtracting one from the total number of use plans as the remaining number of use plans. When the remaining number after the update becomes less than a threshold, the setting unit 34 acquires the reservation accepted date indicated by the record as the date of change when the number of plans has changed to be less than a specified threshold and ends the processing for the current target facility. On the other hand, when the number of vacancies after the subtraction is one or more, the setting unit 34 ends the processing for the first record and proceeds to processing of the next record. Further, when the remaining number of use plans is equal to or more than a specified threshold also, the setting unit 34 ends the processing for the first record and proceeds to processing of the next record. The processing of the second and subsequent records is the same as that of the first record. The setting unit 34 repeats this processing until acquiring the date of change or until finishing processing the final record for one target facility.

In the case where the date of change exists, the setting unit 34 counts the number of days from the date of change to the corresponding past date, and sets the date which is earlier than the scheduled date of use by that number of days as the estimated date for plan selection.

On the other hand, in the case where the date of change does not exist, the setting unit 34 sets a message indicating that plan selection is possible until the last minute for the target facility without setting the estimated date, "Plan selection is possible until the last minute" means that a user can request one plan among many plans at any time (for example, until the day before the scheduled date of use) with no concern about the number of days to the scheduled date of use.

After the setting unit 34 performs the processing of setting the estimated date or the message for each of the target facilities, it outputs the estimate information to the presentation unit 35.

The presentation unit 35 is a functional element that provides a user with estimate information about reservations for a target facility or estimate information about plan selection. The presentation unit 35 creates a web page on which the estimate information is shown and transmits it to the user terminal T, and the user terminal T displays the web page.

Figure 11:
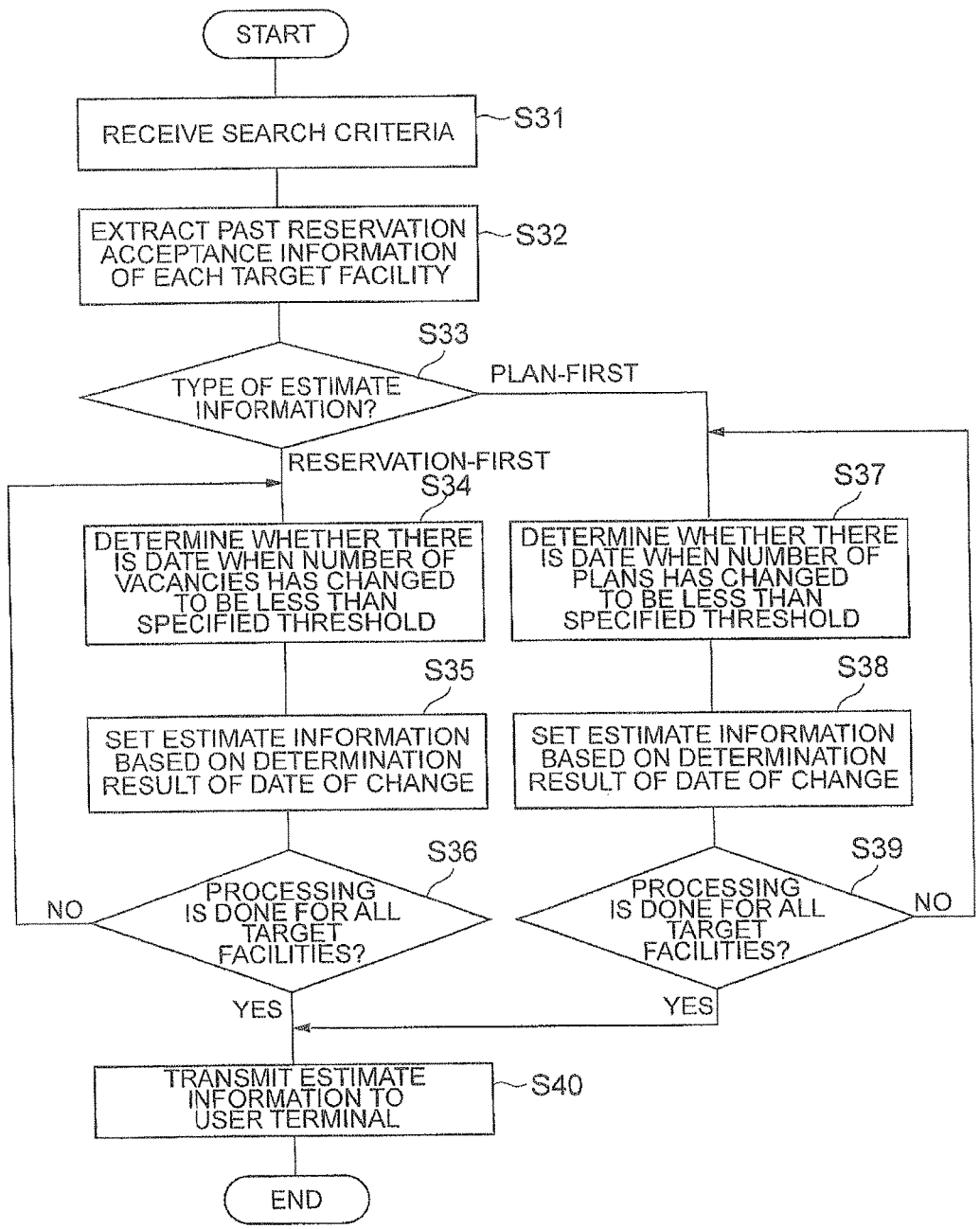
FIG. 11 is a flowchart showing an operation of the information provision device according to the third embodiment.

The operation of the information provision device 30 is described, and further an information provision method according to this embodiment is described hereinafter with reference to FIG. 11.

First, the receiving unit 31 receives search criteria containing a user ID, a target facility ID and the scheduled date of use (Step S31). Next, the extraction unit 32 extracts the past reservation acceptance information for each target facility in the same manner as in the first embodiment (Step S32). Then, the mode determination unit 33 determines the type (mode) of the estimate information (Step S33). The mode determination unit 33 calculates the statistics of differences between the scheduled date of use and the reservation accepted date and thereby obtains the tendency of a user about how many days before use the user makes a reservation. When the statistics are less than a specified threshold, the mode determination unit 33 selects the reservation-first mode, and when the statistics are equal to or more than the threshold, the mode determination unit 33 selects the plan-first mode.

In the case of the reservation-first mode (reservation-first in Step S33), the setting unit 34 performs the same processing as in Steps S13 to S15 in the first embodiment (Steps S34 to S36), and the presentation unit 35 transmits the estimate information to the user terminal T (Step S40).

On the other hand, in the case of the plan-first mode (plan-first in Step S33), the setting unit 34 obtains a change in the number of plans of the target facility during the determination target period based on the extracted reservation acceptance information, and determines whether there is the date of change when the number of plans has changed to be less than a specified threshold during the determination target period (Step S37). Then, the setting unit 34 sets the estimate information based on the determination result of the date of change (Step S38). The setting unit 34 performs the processing of Steps S37 and S38 for all target facilities (see Step S39). Finally, the presentation unit 35 transmits the estimate information to the user terminal T (Step S40).

Figure 12:
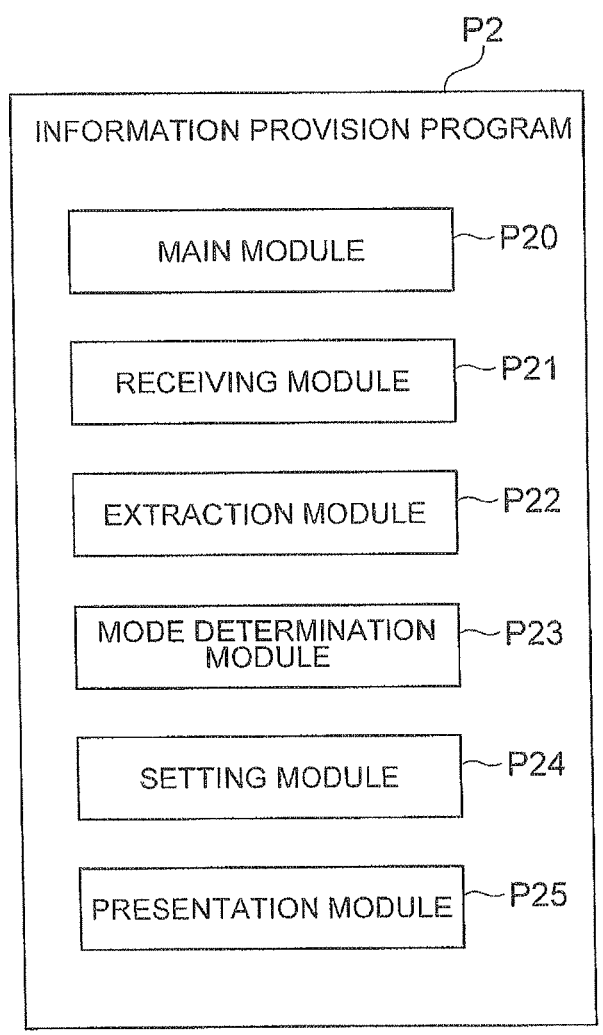
FIG. 12 is a block diagram showing a configuration of an information provision program according to the third embodiment.

An information provision program P2 for implementing the information provision device 30 is described hereinafter with reference to FIG. 12.

The information provision program P2 includes a main module P20, a receiving module P21, an extraction module P22, a mode determination module P23, a setting module P24, and a presentation module P25.

The main module P20 is a part that exercises control over the information provision function. The functions implemented by executing the receiving module P21, the extraction module P22, the mode determination module P23, the setting module P24 and the presentation module P25 are equal to the functions of the receiving unit 31, the extraction unit 32, the mode determination unit 33, the setting unit 34 and the presentation unit 35 described above, respectively.

The information provision program P2 can be provided in the same manner as the information provision program P1 in the first embodiment.

As described above, in this embodiment also, it is possible to show a user when to make a reservation for use of a facility. In addition, in this embodiment, one of two types of estimate information, which are reservation-first and plan-first, is selectively output based on the reservation acceptance information of a user, and it is thereby possible to show the estimate information that matches the user's tendency of reservations.

Fourth Embodiment

An information provision system 2 according to a fourth embodiment is a computer system that presents when, where and what event will take place to a user in order to give the user the motivation for action, and further shows the user the time until when it is advisable to make a reservation for use of a facility. Hereinafter, points different from the first embodiment are particularly described, and the same points as in the first embodiment are not redundantly described.

Figure 13:
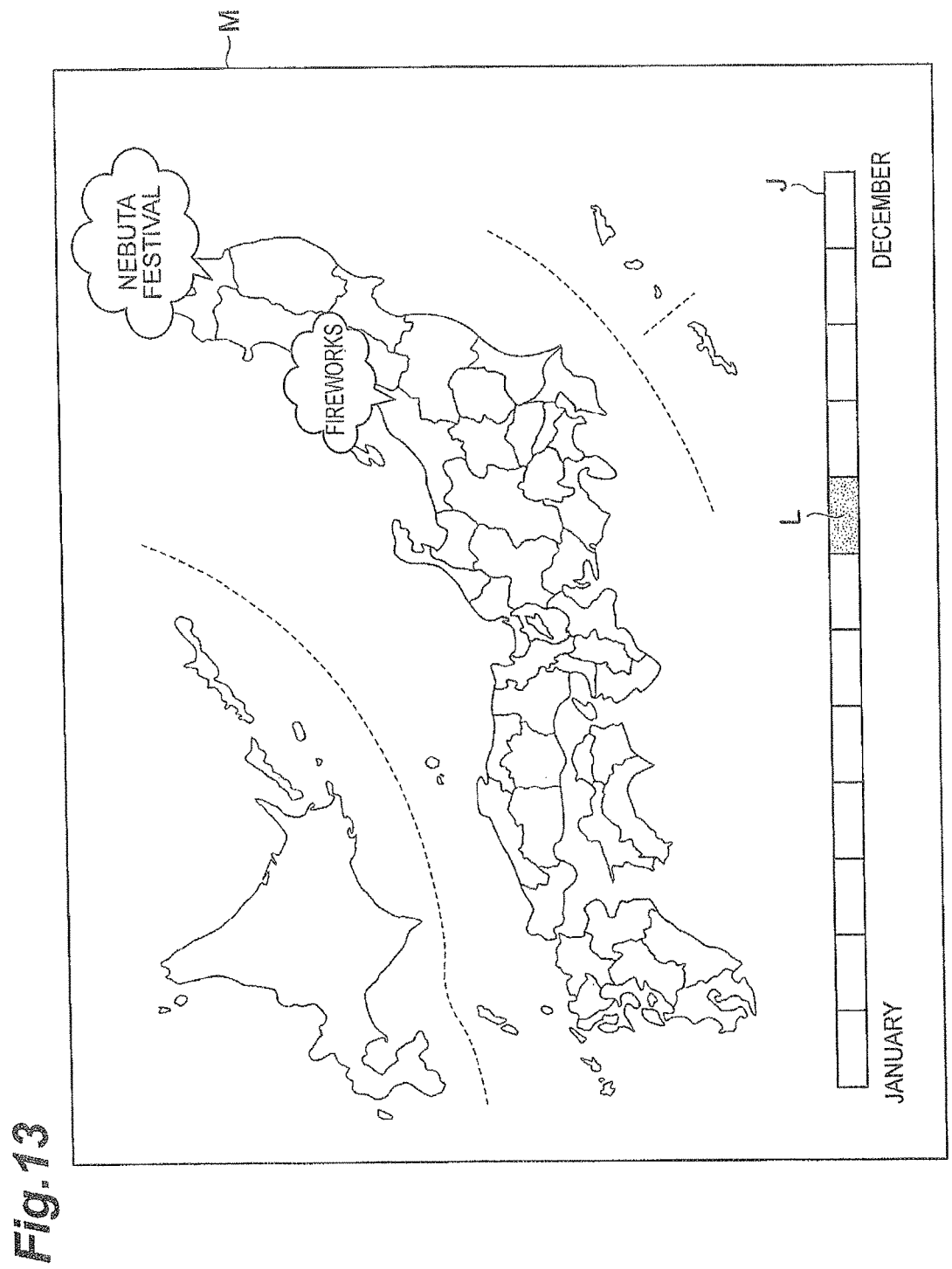
FIG. 13 is a view showing an example of a screen provided by an information provision system according to a fourth embodiment.

FIG. 13 shows an example of a screen that is provided from the information provision system 2 to a user. The screen M includes a map of Japan and a time axis J, and events that take place in the time that is indicated by a slider L on the time axis J are shown by speech balloons. The position where a speech balloon is displayed indicates the place where the event takes place. The example of FIG. 13 shows that, in August, Nebuta Festival is held in Aomori Prefecture, and a fireworks display is held in Niigata Prefecture. The information in the screen M is generated based on comments from many users. With this screen, a user can find when, where and what event will take place.

Figure 14:
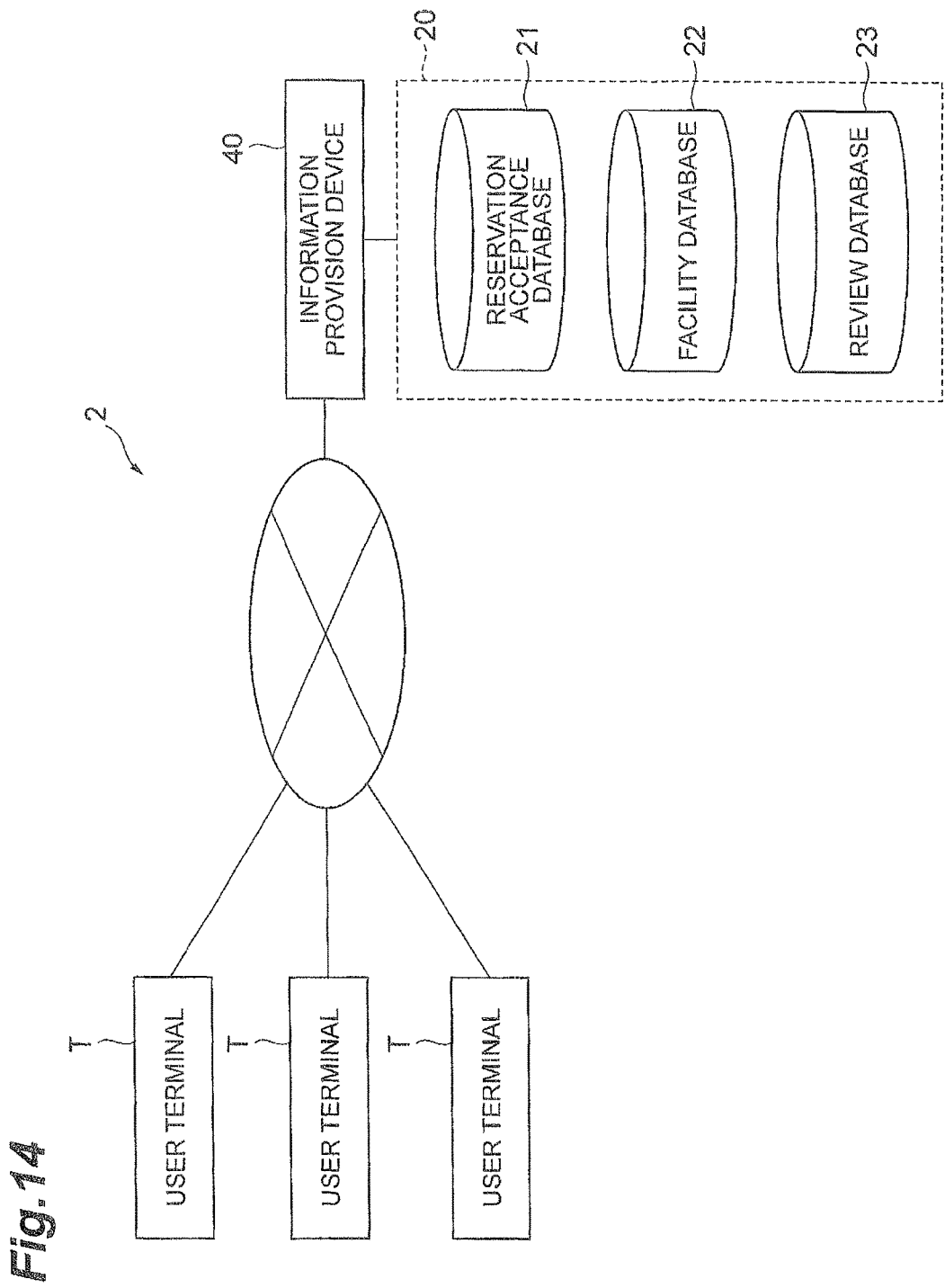
FIG. 14 is a view showing an overall configuration of an information provision system according to the fourth embodiment.

As shown in FIG. 14, the information provision system 2 includes user terminals T, an information provision device 40, and databases (storage units) 20. The databases 20 include a review database 23 in addition to the reservation acceptance database 21 and the facility database 22.

The review database 23 is a device that stores comments posted via the Internet by users of facilities. The posted comments are stored in the review database 23 as review information. For example, when a user enters impressions of a hotel where he/she has stayed and presses a Send button on an accommodation reservation site, the user terminal T transmits the input data to a specified server, and the server generates review information containing the comment and stores it into the review database 23. Note that the procedure to generate and store the review information is not particularly limited as long as the review information is eventually stored in the review database 23.

In this embodiment, a record of the review information contains the following items. Note that, however, the review information may contain other items. Because a user ID is not used in the process described later, this item can be omitted.

Figure 15:
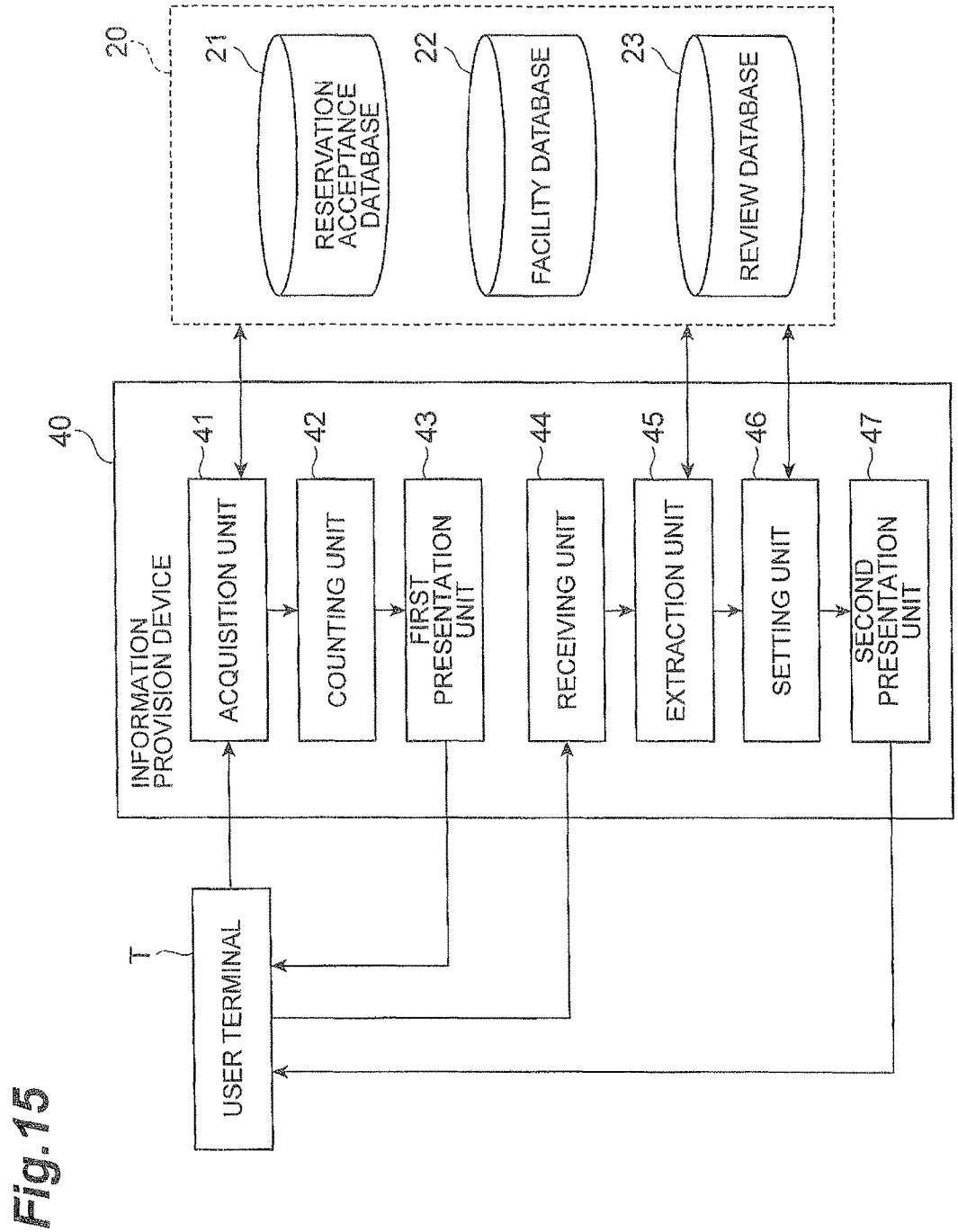
FIG. 15 is a block diagram showing a functional configuration of an information provision device according to the fourth embodiments.

User ID that uniquely specifies a reviewer; Facility ID that uniquely specifies a facility used by a reviewer; Day when a reviewer used a facility (date of use); Comments As shown in FIG. 15, the information provision device 40 includes, as functional elements, an acquisition unit 41, a counting unit 42, a first presentation unit (additional presentation unit) 43, a receiving unit 44, an extraction unit 45, a setting unit 46, and a second presentation unit 47.

The acquisition unit 41 is a functional element that acquires a set of an area where a facility is located, a keyword contained in a comment by a user of the facility, and the time corresponding to the date of use of the facility by the user (which is referred to hereinafter simply as "set") by referring to the review database 23 and the facility database 22. The acquisition unit 41 performs the following processing upon receiving from the user terminal T a signal that requests the screen as shown in FIG. 13.

First, the acquisition unit 41 reads from the review database 23 the records of review information required for the processing. The acquisition unit 41 may read all records or may read only the records that match the search criteria. For example, the acquisition unit 41 may read only the records where the date of use is within a specified period in the past (within the last one year, the last two years, the last half year etc.). Alternatively, the acquisition unit 41 may read only the records related to facilities located in a specific area (in Japan, Tohoku region etc.). Alternatively, the acquisition unit 41 may read only the records that match the search criteria of both the period and the area. The criteria for extracting the records may be specified by a user, and in this case, the acquisition unit 41 may receive the criteria from the user terminal T.

Then, the acquisition unit 41 creates a set from the respective records of the review information. Processing of creating a set from one record is described hereinafter.

First, the acquisition unit 41 reads the address of a facility by referring to the facility database 22, and specifies the area corresponding to the address. The acquisition unit 41 has in advance the correspondence table between addresses and areas. The acquisition unit 41 converts the address of a facility into the area by using the correspondence table and determines the area item of the set. For example, if the location of a facility is " . . . , Kofu City, Yamanashi Prefecture", and each prefecture is previously defined as one area, the acquisition unit 41 determines that the area item is "Yamanashi Prefecture".

The area that is prepared as one item of the set is a geographical range with a certain size. For example, one area can correspond to one local region, one prefecture, one city, town, or village and the like. Note that the size of the area is not limited thereto, and the area may be set with a certain standard. For example, each area may be defined so that the number of facilities in an area is equal to or more than a specified value (for example, more than ten).

Further, the acquisition unit 41 specifies the time corresponding to the date of use. The time that is prepared as one item of the set is a time range with a certain length. For example, one time can correspond to one month (or one month in a specific year), one week (or one week in a specific year), one day (one day in a specific year) and the like, though the way to set the time is not limited thereto. For example, if the date of use is "Aug. 5, 2012", and one month is previously defined as one time, the acquisition unit 41 determines that the time is "August". If one time is defined by year and month, the time corresponding to the date of use is "August, 2012".

Then, the acquisition unit 41 extracts a keyword from a comment by morphological analysis. In this embodiment, it is assumed that the acquisition unit 41 acquires a noun ("fireworks", "autumn leaves" etc.) or a noun phrase ("magnificent fireworks", "beautiful autumn leaves") as the keyword. Note that, however, because the keyword may be any word or phrase that can be used as information to help deciding a plan for action, the part of speech of a word to be extracted as the keyword is not limited as long as it satisfies such requirements. For example, if a comment is "We enjoyed grape picking in a farm on the way to our hotel", the acquisition unit 41 acquires the nouns "hotel", "farm" and "grape picking" from this comment. Alternatively, the acquisition unit 41 may acquire "farm on the way to our hotel" as a noun phrase. In this manner, the keyword to be extracted from a comment is not limited to one, and several keywords may be extracted. On the other hand, if a comment is "We enjoyed very much", because there is no noun or noun phrase, the acquisition unit 41 does not extract any keywords from this comment in this embodiment.

After that, the acquisition unit 41 creates the same number of sets as the number of acquired keywords. For example, it is assumed that the area "Yamanashi Prefecture" and the time "August" are specified, and the three keywords "hotel", "farm" and "grape picking" are acquired. In this case, the acquisition unit 41 creates three sets {Yamanashi Prefecture, August, hotel}, {Yamanashi Prefecture, August, farm} and {Yamanashi Prefecture, August, grape picking}. Note that one set is represented as {area, time, keyword}. When the same keyword appears a plurality of times in one comment, the acquisition unit 41 creates only one set for the keyword.

After creating the sets, the acquisition unit 41 proceeds to processing of the next record. When no keyword is extracted, the acquisition unit 41 proceeds to processing of the next record without creating any set. When the processing is done for all the read records, the acquisition unit 41 outputs all of the created sets to the counting unit 42.

The counting unit 42 is a functional element that calculates the distribution of the number of sets for each pair of an area and a keyword. Note that the number of sets of each pair is, in other words, the number of reviews corresponding to the combination of an area and a keyword.

First, the counting unit 42 sorts the input sets into groups of each pair of an area and a keyword. For example, when the counting unit 42 processes a pair of the area "Yamanashi Prefecture" and the keyword "hotel", one or more sets of {Yamanashi Prefecture, January, hotel}, one or more sets of {Yamanashi Prefecture, February, hotel} and the like are sorted into one group of the pair {Yamanashi Prefecture, hotel}". Note that one pair is represented as {area, keyword}.

Next, the counting unit 42 counts the number of sets in each time during a specified period for each pair and thereby obtains the distribution of the number of sets in the period. The way to set a specified period and each time is not limited. For example, a specified period may be one year, and each month may be each time, or a specified period may be one week, and each day of the week may be each time.

Figure 16:
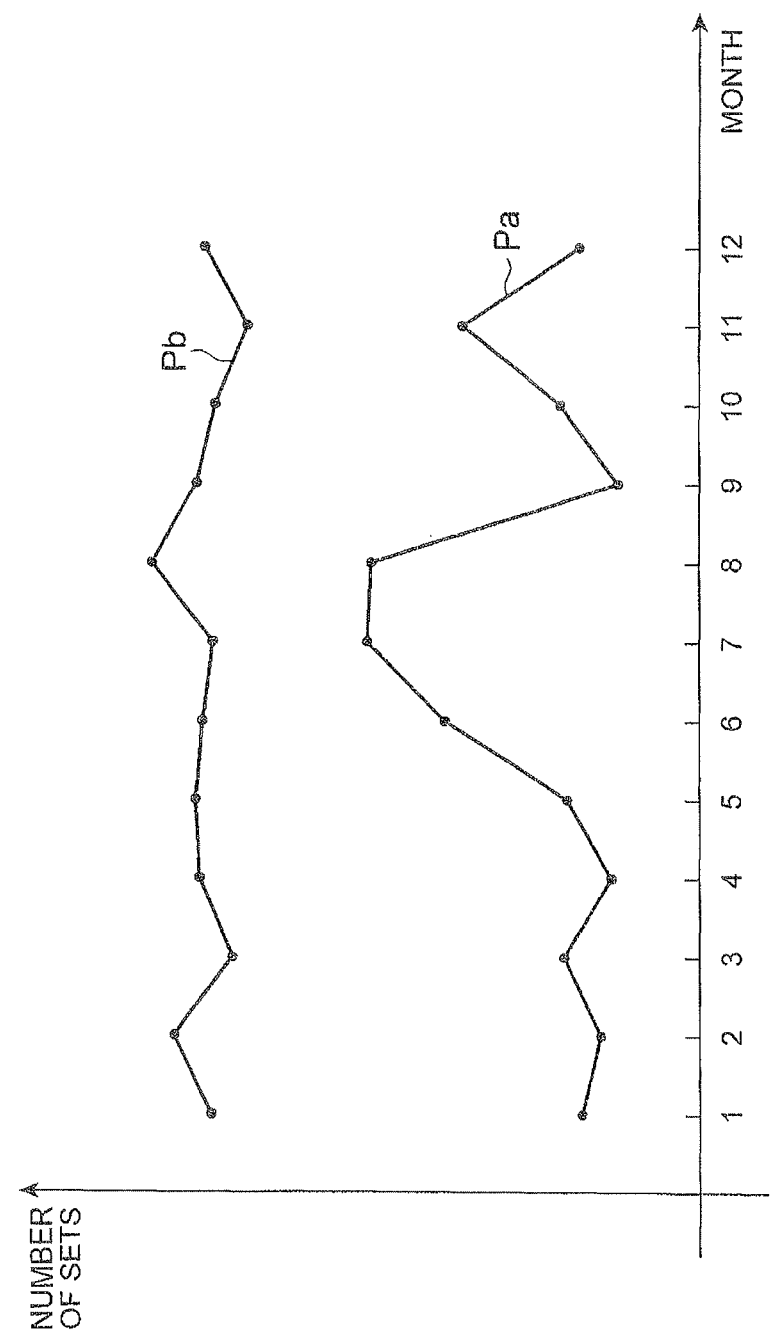
FIG. 16 is a view showing a concept of a burst time.

FIGS. 16 and 17 show an example of the distribution of the number of sets. FIG. 16 is a graph showing the distribution of the number of sets that is counted on a month-by-month basis in one year for each of pairs Pa and Pb. FIG. 17 shows the distribution for two pairs {area A, keyword Ka} and {area A, keyword Kb} in a table, where a specified period is one year and each month is one time.

The counting unit 42 outputs data indicating the distribution of the number of sets for each pair to the first presentation unit 43.

The first presentation unit 43 is a functional element that outputs information about a pair of an area and a keyword having a burst time, in association with the burst time.

First, the first presentation unit 43 determines the presence or absence of a burst time for each pair. The "burst time" in this specification is the time when the number of sets is larger than that in the other periods by a specified criterion (which is also referred to hereinafter as "burst criterion") or more. The burst time is, in other words, the time when the frequency of appearance of a specific keyword in a specific area is outstandingly high.

The concept of the burst time is described with reference to FIG. 16. For the pair Pa, the number of sets is outstanding in July and August, and those two times are set as the burst time. Further, for this pair Pa, the number of sets is also large in June and November, and there is a possibility that those times are also set as the burst time. On the other hand, for the pair Pb, the number of sets does not vary largely throughout the year, and it is determined that there is no burst time.

The first presentation unit 43 determines whether each time for one pair corresponds to the burst time. Specifically, the first presentation unit 43 compares the number of sets Nx in a time Tx to be determined with the statistics Na of the number of sets in the other n number of times T1, T2, . . . , Tn. Then, the first presentation unit 43 determines that the time Tx is the burst time when the number of sets Nx is larger than the statistics Na by a specified criterion or more, and otherwise determines that the time Tx is not the burst time. The burst criterion can be represented by an arbitrary multiple or percentage (for example, five times, ten times, 150% etc.). An example of the statistics is an average value, a median value or the like, though the statistics is not limited thereto.

Application of such a determination process to the example of FIG. 17 is as follows. It is assumed that there are two types of burst criteria: five times and ten times.

First, the case of the pair {area A, keyword Ka} is described. The number of sets in January is 45, and the average of the number of sets in the other months (February to December) is $(52+60+ \ldots +47)/11 \approx 53.4$. Further, the median of the number of sets in the other months is 54. When any of the average and the median is used as the statistics, the number of sets in January is neither five times nor ten times the statistics, and therefore the first presentation unit 43 determines that January is not the burst time.

As for February, the number of sets in this month is 52, and the average of the number of sets in the other months (January and Match to December) is $(45+60+48+ \ldots +47) \approx 52.7$. Further, the median of the number of sets in the other months is 54. When any of the average and the median is used as the statistics, the number of sets in February is neither five times nor ten times the statistics, and therefore the first presentation unit 43 determines that February is also not the burst time.

For the pair {area A, keyword Ka}, none of the Match to December is the burst time. Therefore, the first presentation unit 43 determines that there is no burst time for the pair {area A, keyword Ka}.

Next, the case of the pair {area A, keyword Kb} is described, and description is given only for July and August when the number of sets is relatively large.

The number of sets in July is 150, and the average of the number of sets in the other months is about 38.4. Further, the median of the number of sets in the other months is 10. Thus, when the average is used, the number of sets in July is neither five times nor ten times the average value, and therefore the first presentation unit 43 determines that July is also not the burst time. On the other hand, when the median is used, the number of sets in July is both five times and ten times the median value, and therefore the first presentation unit 43 determines that July is the burst time when the burst criterion is any of those.

The number of sets in August is 180, and the average of the number of sets in the other months is 35.6. Further, the median of the number of sets in the other months is 10. Thus, when the average is used, the first presentation unit 43 determines that July is the burst time only when the burst criterion is set to five times. On the other hand, when the median is used, the first presentation unit 43 determines that July is the burst time when the burst criterion is any of the five times and ten times.

Therefore, the first presentation unit 43 determines that there is a burst time for the pair {area A, keyword Kb}. Note that, however, which month is the burst time varies depending on the statistics and the burst criterion used.

The first presentation unit 43 performs the determination about the burst time for all pairs. The first presentation unit 43 then sets the burst time only for the pair with the burst time, and discards the information of the pair without the burst time. Note that, in this specification, a keyword having the burst time in a certain area is also referred to as "burst word".

After that, the first presentation unit 43 creates a web page as for example shown in FIG. 13 by using the data of the pair having the burst time, and transmits the web page as a response signal to the user terminal T. The user terminal T displays the web page, and the user can thereby find when, where and what event will take place.

The functions of the web page are described hereinafter with reference back to FIG. 13. When one time is selected on the time axis J by a user operation, a program (which is referred to hereinafter as "display control program") of the web page displays information of the pair whose burst times corresponds to the selected period. To be specific, as shown in FIG. 13, the display control program draws a speech balloon at the position corresponding to the area item of the pair and puts a keyword (burst word) inside the speech balloon. Note that the way to represent the correspondence between the area and the keyword is not limited to the speech balloon, and any other figures or visual effects may be used.

The display control program sets the slider L on the time axis. A user can change the time by moving the slider L. After this operation, the display control program deletes information of the pair displayed until then and displays information of the pair whose burst time corresponds to the time after change. Note that a user interface for changing the time is not limited to the slider, and it may be another GUT (Graphical User Interface) such as a text box or a radio button.

By clicking on a speech balloon (by selecting a keyword), a user can display the estimate information of the facilities located in the area corresponding to the speech balloon (keyword) on the screen. The display control program transmits to the information provision device 40 the area corresponding to the speech balloon clicked on and the currently selected time as search criteria. After that, the display control program receives the estimate information that is transmitted from the information provision device 40 in response to the transmission and displays the estimate information on the screen M or on another window. For example, the display control program displays the estimate information as shown in FIG. 1.

In the process of generating the presenting the estimate information, though the processing of receiving search criteria is different from that of the first embodiment, the subsequent processing is the same as that of the first embodiment.

The receiving unit 44 reads from the facility database 22 one or more facility IDs corresponding to the area indicated by the search criteria received from the user terminal T as target facility ID(s). Further, the receiving unit 44 determines the scheduled date of use based on the time indicated by the search criteria. When the time is a specific date, the receiving unit 44 acquires the search criteria as it is as the scheduled date of use. When, on the other hand, the time is indicated by month or week, the receiving unit 44 may determine the scheduled date of use with a certain standard. Note that, however, the scheduled date of use needs to be a future date.

For example, when the current date is Jun. 1, 2013, and the time indicated by the search criteria is "August", the receiving unit 44 may set the first day of the time (Aug. 1, 2013), the last day of the time (Aug. 31, 2013) or another date (Aug. 10, 2013, Aug. 15, 2013 etc.) as the scheduled date of use. Alternatively, the receiving unit 44 may request the user terminal T to specify the scheduled date of use and receive the data transmitted in response to the request. After acquiring the target facility ID and the scheduled date of use, the receiving unit 44 outputs those data to the extraction unit 45.

The processing of the extraction unit 45, the setting unit 46 and the second presentation unit 47 is the same as the processing of the extraction unit 12, the setting unit 13 and the presentation unit 14 in the first embodiment. As a result of such processing, the estimate information as shown in FIG. 1 is displayed on the user terminal T.

Figure 18:
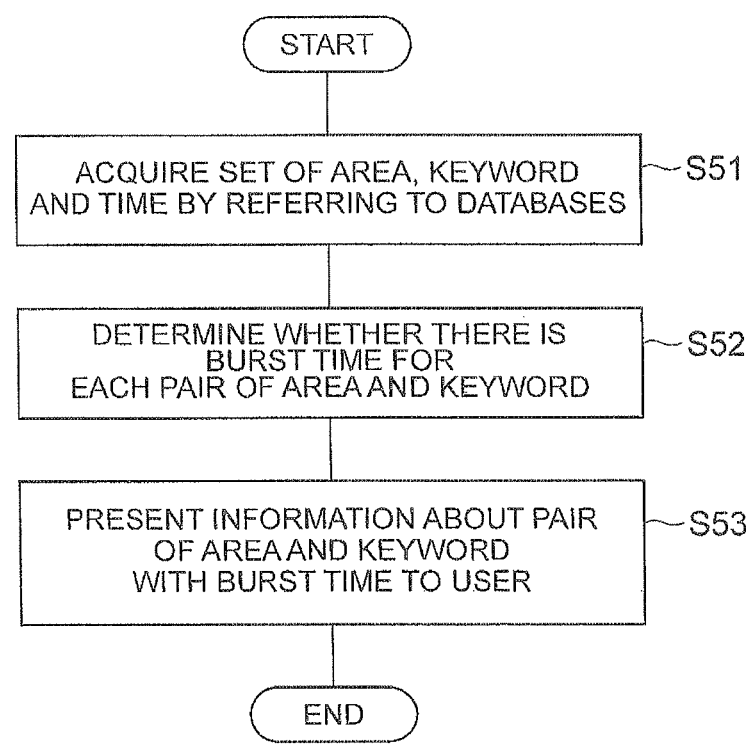
FIG. 18 is a flowchart showing a part of an operation of the information provision device according to the fourth embodiment.

The processing of the information provision device 40 to show information of the burst word to a user is described hereinafter with reference to FIG. 18.

First, the acquisition unit 41 acquires sets of areas, keywords and times by referring to the review database 23 and the facility database 22 (Step S51). In this processing, the acquisition unit 41 extracts a keyword by morphological analysis of comments, specifies an area from the facility information and specifies a time from the date of use.

Then, the counting unit 42 obtains the distribution of the number of sets in a specified period for each pair of an area and a keyword.

Then, the first presentation unit 43 determines whether there is a burst time (Step S52). When the number of sets in a time to be determined is larger than the statistics of the number of sets in the other times by a specified criterion or more, the first presentation unit 43 determines that the time to be determined is the burst time, and otherwise determines that the time to be determined is not the burst time. The first presentation unit 43 performs this processing for each pair.

Then, the first presentation unit 43 presents information about pairs of areas and keywords with the burst time to the user (Step S53). In this processing, the first presentation unit 43 transmits the screen (web page) as shown in FIG. 13 to the user terminal T, and the user terminal T displays the screen. This screen displays the pairs of areas and keywords in association with the burst time. Thus, the user can find when, where and what event will take place by using the screen.

By clicking on a speech balloon on the screen, a user can see the estimate information of facilities in the area corresponding to the speech balloon. The procedure when the speech balloon is clicked on is the same as in the first embodiment and thus not redundantly described.

Figure 19:
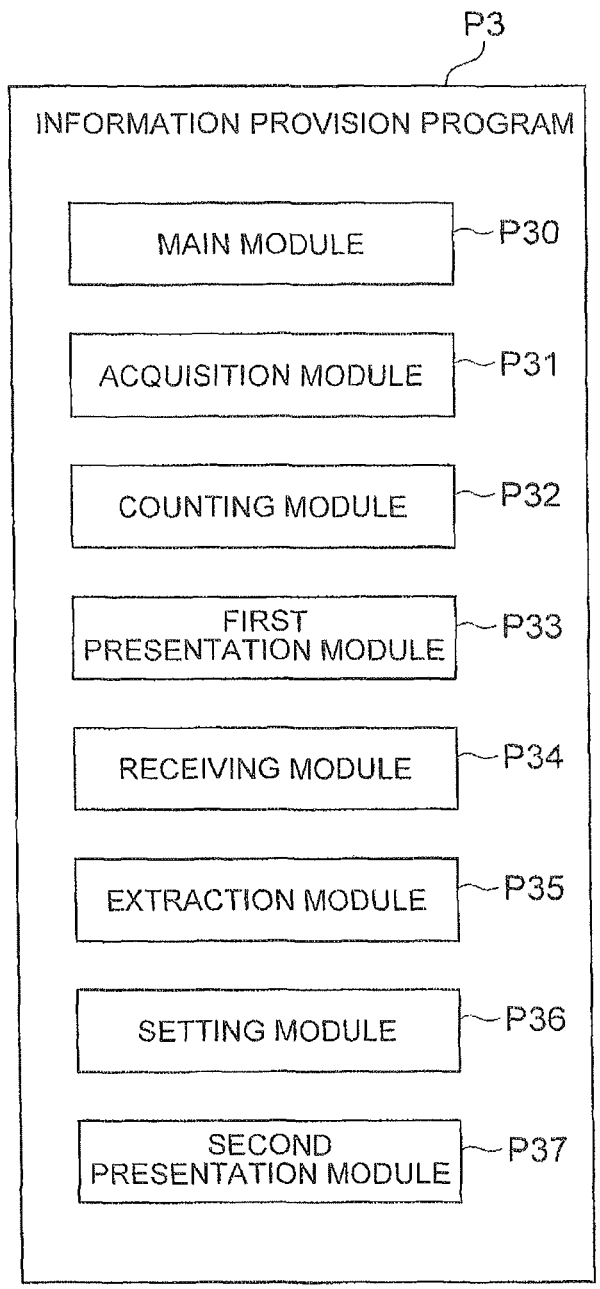
FIG. 19 is a block diagram showing a configuration of an information provision program according to the fourth embodiment.

An information provision program P3 for implementing the information provision device 40 is described hereinafter with reference to FIG. 19.

The information provision program P3 includes a main module P30, an acquisition module P31, a counting module P32, a first presentation module P33, a receiving module P34, an extraction module P35, a setting module P36, and a second presentation module P37.

The main module P30 is a part that exercises control over the information provision function. The functions implemented by executing the acquisition module P31, the counting module P32, the first presentation module P33, the receiving module P34, the extraction module P35, the setting module P36 and the second presentation module P37 are equal to the functions of the acquisition unit 41, the counting unit 42, the first presentation unit 43, the receiving unit 44, the extraction unit 45, the setting unit 46 and the second presentation unit 47 described above, respectively.

The information provision program P3 can be provided in the same manner as the information provision program P1 in the first embodiment.

As described above, in this embodiment, by presenting when, where and what event will take place, it is possible to provide a user with information to help deciding a plan for action. In addition, it is possible to show the user when to make a reservation for use of a facility just like in the above-described embodiments.

In the fourth embodiment, if the scheduled date of the event described in the speech balloon can be acquired from a specified database, the receiving unit 44 may acquire the date before the event date and the date after the event date (for example, one week after the event date) as two scheduled dates of use. In this case, the extraction unit 45, the setting unit 46 and the second presentation unit 47 generate, for each target facility, the estimate information for each of the two scheduled dates of use and transmit them to the user terminal T. By this processing, the estimate information indicating that "Make reservations for event dates until Nov. 10, 2013, and make reservations for a date one week after event dates until Jan. 5, 2014", for example, for a certain facility is presented to a user. In this case, it is possible to show a user when to make reservations for both of the case of participating in the event and the case of avoiding the event.

Embodiments of the present invention are described in detail above. However, the present invention is not limited to the above-described embodiments. Various changes and modifications may be made to the present invention without departing from the scope of the invention.

The mode selection processing described as the third embodiment can be applied also to the second and fourth embodiments. Further, the technique of giving a user the motivation for action can be applied to any of the first to third embodiments. In this manner, the above-described embodiments can be combined with one another.

The output of the message indicating that last minute reservations are possible and the output of the message indicating that selection of a use plan is possible until the last minute are both omissible. In other words, the information provision device may provide the estimate information to a user only when the estimated date for reservation request or plan selection is set.

REFERENCE SIGNS LIST 1,2 . . . information provision system, 10 . . . information provision device, 11 . . . receiving unit, 12 . . . extraction unit, 13 . . . setting unit, 14 . . . presentation unit, 20 . . . databases, 21 . . . reservation acceptance database, 22 . . . facility database, 23 . . . review database, 30 . . . information provision device, 31 . . . receiving unit, 32 . . . extraction unit, 33 . . . mode determination unit, 34 . . . setting unit, 35 . . . presentation unit, 40 . . . information provision device, 41 . . . acquisition unit, 42 . . . counting unit, 43 . . . first presentation unit, 44 . . . receiving unit, 45 . . . extraction unit, 46 . . . setting unit, 47 . . . second presentation unit, P1 . . . information provision program, P10 . . . main module, P11 . . . receiving module, P12 . . . extraction module, P13 . . . setting module, P14 . . . presentation module, P2 . . . information provision program, P20 . . . main module, P21 . . . receiving module, P22 . . . extraction module, P23 . . . mode determination module, P24 . . . setting module, P25 . . . presentation module, P3 . . . information provision program, P30 . . . main module, P31 . . . acquisition module, P32 . . . counting module, P33 . . . presentation module, P34 . . . receiving module, P35 . . . extraction module, P36 . . . setting module, P37 . . . presentation module

The invention claimed is:

1. An information provision device comprising:
at least one memory operable to store computer program code;
at least one processor operable to read said computer program code and operate according to said program code, said code including:
receiving code configured to cause at least one of said at least one processor to receive search criteria containing an identifier of a target facility and a scheduled date of use;
extraction code configured to cause at least one of said at least one processor to extract reservation acceptance information of the target facility corresponding to a past determination target period based on the scheduled date of use in the search criteria by referring to a storage storing reservation acceptance information containing a facility, a scheduled date of use and a reservation accepted date;
setting code configured to cause at least one of said at least one processor to determine a burst time and an event associated with the burst time, calculate a rate of decrease from an initial number of vacancies in the target facility during the past determination target period based on the extracted reservation acceptance information, and when there is a date of change when the number of vacancies has changed to be less than a specified threshold during the determination target period, set an estimated date for a reservation request for using a facility on the scheduled date of use in the search criteria by using the date of change; and
presentation code configured to cause at least one of said at least one processor to create a web page including the burst time, a visual effect representing the event, and set a value as estimate information for reservation request, and transmit the web page to a user terminal that displays the web page.

2. The information provision device according to claim 1, wherein
when the date of change does not exist, the setting code is further configured to cause at least one of said at least one processor to set a message indicating that last minute reservations are possible.

3. The information provision device according to claim 1, wherein
the extraction code is further configured to cause at least one of said at least one processor to further extract reservation acceptance information of the target facility corresponding to a current determination target period based on the scheduled date of use in the search criteria, and
the setting code is further configured to cause at least one of said at least one processor to calculate a difference between a change in the number of vacancies in the target facility during the current determination target period and a change in the number of vacancies during the past determination target period, and adjust the value based on whether there is the date of change during the past determination target period, by using the difference.

4. The information provision device according to claim 3, wherein the setting code is further configured to cause at least one of said at least one processor to:
obtain a first date when the number of vacancies in the target facility has become a current value during the current determination target period,
obtain a second date when the number of vacancies in the target facility has become the current value during the past determination target period, and
adjust the value by using a difference between the first and second dates.

5. The information provision device according to claim 1, wherein
the extraction code is further configured to cause at least one of said at least one processor to extract the reservation acceptance information of the target facility for each of a plurality of past determination target periods, and
the setting code is further configured to cause at least one of said at least one processor to count the number of days from the date of change to an end of the past determination target period for each of the plurality of past determination target periods, and set the estimated date based on the date of change during the past determination target period with a largest number of days.

6. The information provision device according to claim 1, further comprising:
mode determination code configured to cause at least one of said at least one processor to determine a type of information to be set, wherein
the reservation acceptance information contains a facility use plan, a person who makes a reservation for the use plan, the scheduled date of use of the use plan, and the reservation accepted date, the search criteria further contain a user ID,
the mode determination code is further configured to cause at least one of said at least one processor to calculate a difference between the scheduled date of use and the reservation accepted date indicated by the reservation acceptance information corresponding to the user ID, determine to set the estimate information in reservation-first mode when the difference is less than a specified threshold, and determine to set the estimate information in plan-first mode when the difference is equal to or more than the threshold,
in the reservation-first mode, the setting code is further configured to cause at least one of said at least one processor to set the estimate information for reservation request, and
in the plan-first mode, the setting code is further configured to cause at least one of said at least one processor to calculate a rate of decrease from a total number of use plans in the target facility during the past determination target period based on the extracted reservation acceptance information, and when there is a date of change when a remaining number has changed to be less than a specified threshold during the determination target period, set the estimated date allowing selection among a plurality of use plans by using the date of change.

7. The information provision device according to claim 1, further comprising:

acquisition code configured to cause at least one of said at least one processor to, by referring to a storage storing data containing a location of a facility, a comment posted by a user of the facility, and a date of use of the facility by the user in association with one another, acquire a set of an area where the facility is located, a keyword extracted from the comment, and a period corresponding to the date of use;
counting code configured to cause at least one of said at least one processor to count a number of sets in each time during a specified period for each pair of the area and the keyword and thereby obtain a distribution of the number of sets, wherein the web page further includes information about the pair having the burst time where the number is larger than in other times by a specified criterion or more, in association with the burst time, and
the receiving code is further configured to cause at least one of said at least one processor to receive the search criteria generated based on a user operation performed in response to the created web page.

8. The information provision device according to claim 7, wherein
the information about the pair contains a date of the event indicated by the keyword,
the receiving code is further configured to cause at least one of said at least one processor to receive search criteria containing a first scheduled date of use on or before an event date and a second scheduled date of use after the event date,
the extraction code and the setting code cause at least one of said at least one processor to perform processing for each of the first and second scheduled dates of use, and
the web page further includes the estimate information for each of the first and second scheduled dates of use.

9. An information provisioning method performed by at least one processor in an information provision device, comprising:
receiving search criteria containing an identifier of a target facility and a scheduled date of use;
extracting reservation acceptance information of the target facility corresponding to a past determination target period based on the scheduled date of use in the search criteria by referring to a storage storing reservation acceptance information containing a facility, a scheduled date of use and a reservation accepted date;
determining a burst time and an event;
calculating a rate of decrease from an initial number of vacancies in the target facility during the past determination target period based on the extracted reservation acceptance information, and when there is a date of change when the number of vacancies has changed to be less than a specified threshold during the determination target period, setting an estimated date for a reservation request for using a facility on the scheduled date of use in the search criteria by using the date of change;
creating a web page including the burst time, a visual effect representing the event, and a value set as estimate information for reservation request;
transmitting the web page to a user terminal that displays the web page.

10. A non-transitory computer-readable medium storing an information provision program causing a computer to:
receive search criteria containing an identifier of a target facility and a scheduled date of use;
determine a burst time and an event;

extract reservation acceptance information of the target facility corresponding to a past determination target period based on the scheduled date of use in the search criteria by referring to a storage storing reservation acceptance information containing a facility, a scheduled date of use and a reservation accepted date;

calculate a rate of decrease from an initial number of vacancies in the target facility during the past determination target period based on the extracted reservation acceptance information, and when there is a date of change when the number of vacancies has changed to be less than a specified threshold during the determination target period, set an estimated date for a reservation request for using a facility on the scheduled date of use in the search criteria by using the date of change;

create a web page including the burst time, a visual effect representing the event, and a value set as estimate information for reservation request;

transmit the web page to a user terminal that displays the web page.

* * * * *